United States Patent
Li

(10) Patent No.: US 9,424,442 B2
(45) Date of Patent: Aug. 23, 2016

(54) NONVOLATILE MEMORY AND ELECTRONIC DEVICE

(71) Applicant: HUAWEI TECHNOLOGIES CO., LTD., Shenzhen, Guangdong (CN)

(72) Inventor: Yansong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 14/559,177

(22) Filed: Dec. 3, 2014

(65) Prior Publication Data

US 2015/0149790 A1 May 28, 2015

Related U.S. Application Data

(63) Continuation of application No. PCT/CN2014/076595, filed on Apr. 30, 2014.

(30) Foreign Application Priority Data

Nov. 27, 2013 (CN) .......................... 2013 1 0613032

(51) Int. Cl.
*G06F 21/79* (2013.01)
*G06F 7/58* (2006.01)

(52) U.S. Cl.
CPC ............ *G06F 21/79* (2013.01); *G06F 7/584* (2013.01)

(58) Field of Classification Search
CPC .............................. G06F 21/79; G06F 7/584
USPC ........................................................ 726/193
See application file for complete search history.

(56) References Cited

U.S. PATENT DOCUMENTS

| 2003/0084234 A1* | 5/2003 | Hang | G11C 7/1006 |
| | | | 711/105 |
| 2003/0151968 A1* | 8/2003 | Johnson | G11C 7/1045 |
| | | | 365/230.03 |
| 2004/0205429 A1* | 10/2004 | Yoshida | G11C 29/26 |
| | | | 714/718 |

(Continued)

FOREIGN PATENT DOCUMENTS

| CN | 1664796 | 9/2005 |
| CN | 101000582 | 7/2007 |

(Continued)

OTHER PUBLICATIONS

Extended European Search Report dated Jun. 17, 2015 in corresponding European Patent Application No. 14784396.5.

(Continued)

*Primary Examiner* — Jeffrey Pwu
*Assistant Examiner* — Nega Woldemariam
(74) *Attorney, Agent, or Firm* — Staas & Halsey LLP

(57) ABSTRACT

The embodiments of the present invention disclose a nonvolatile memory and an electronic device, where each time the nonvolatile memory is powered on, an exchanger is used to implement a random exchange of at least one address subsignal and its inverted signal in a bank decoder and/or a row decoder in a bank and/or a column decoder in a bank, which causes that data stored before the nonvolatile memory is powered off is interrupted when the nonvolatile memory is powered off and then powered on and that data stored in the nonvolatile memory cannot be read sequentially from original storage addresses to achieve an encrypting effect and increase security of the data stored in the nonvolatile memory.

14 Claims, 9 Drawing Sheets

(56) References Cited

U.S. PATENT DOCUMENTS

| | | | |
|---|---|---|---|
| 2005/0047255 A1* | 3/2005 | Park | G11C 7/1075 365/230.05 |
| 2005/0249018 A1* | 11/2005 | Lee | G11C 7/1075 365/230.05 |
| 2007/0080905 A1* | 4/2007 | Takahara | G09G 3/3233 345/76 |
| 2008/0209117 A1* | 8/2008 | Kajigaya | G06F 12/1433 711/104 |
| 2009/0073797 A1* | 3/2009 | Song | G11C 8/08 365/230.03 |
| 2009/0303825 A1* | 12/2009 | Kim | G11C 8/12 365/230.03 |
| 2010/0302886 A1* | 12/2010 | Choi | G11C 29/40 365/198 |
| 2011/0271038 A1* | 11/2011 | Ferrario | G11C 7/1051 711/103 |
| 2012/0324141 A1* | 12/2012 | Seong | G06F 12/0238 711/3 |
| 2013/0094320 A1* | 4/2013 | Yoo | G11C 8/06 365/230.06 |
| 2013/0170274 A1 | 7/2013 | Yu et al. | |
| 2013/0250677 A1 | 9/2013 | Nam et al. | |

FOREIGN PATENT DOCUMENTS

| | | |
|---|---|---|
| CN | 102567689 A | 7/2012 |
| CN | 102568573 | 7/2012 |
| CN | 103187092 | 7/2013 |
| CN | 103631732 | 3/2014 |
| WO | 2011/080784 A1 | 7/2011 |

OTHER PUBLICATIONS

PCT International Search Report dated Sep. 11, 2014 in corresponding International Patent Application No. PCT/CN2014/076595.

Chinese Office Action dated Jan. 28, 2016 in corresponding Chinese Patent Application No. 201310613032.4.

* cited by examiner

NONVOLATILE MEMORY AND ELECTRONIC DEVICE

CROSS-REFERENCE TO RELATED APPLICATIONS

This application is a continuation of International Application No. PCT/CN2014/076595, filed on Apr. 30, 2014, which claims priority to Chinese Patent Application No. 201310613032.4, filed on Nov. 27, 2013, both of which are hereby incorporated by reference in their entireties.

TECHNICAL FIELD

The present invention relates to data encryption technologies, and in particular, to a nonvolatile memory and an electronic device.

BACKGROUND

A nonvolatile memory features non-volativity that information is not lost after a power failure. However, when a nonvolatile memory is used in a certain scenario where relatively high security is required, information stored in the nonvolatile memory after a power failure may risk a leakage.

A phase-change memory of the nonvolatile memory type is used as an example. A phase-change memory is a type of nonvolatile memory that stores information by using different states of a phase-change material. When the phase-change material is in a crystalline state, resistance is relatively small; when the phase-change material is in a non-crystalline state, resistance is relatively large. Corresponding data can be read by detecting a resistance of the phase-change material. Compared with an existing flash memory in the prior art, the phase-change memory has such advantages as quick read and write speeds, abrasion resistance, low power consumption, and high integration. At present, the phase-change memory is likely to replace the flash memory gradually. In the future, the phase-change memory is likely to replace a Dynamic Random Access Memory, DRAM as the memory of an electronic device. When a phase-change memory is used as the memory of an electronic device, to-be-sent original data can be encrypted and then sent or original data can be encrypted and then saved to a hard disk. However, when an application program in the electronic device uses the encrypted data, the electronic device usually implements decryption to obtain the original data and saves the original data to a memory to increase efficiency of reusing the original data later. That is, data in the memory is original data in plaintext. After the electronic device is powered off, if a person removes the phase-change memory used as a memory module and installs the phase-change memory to his/her own computer, the person can use a software tool to read and parse data in the phase-change memory to acquire the original data stored in the phase-change memory, and the original data may include information that needs to be kept secret, such as sensitive information of a user. This causes data stored in the phase-change memory to be relatively insecure.

It may be known based on the foregoing description that data stored in a nonvolatile memory is of poor security because of the non-volativity feature of the nonvolatile memory.

SUMMARY

Embodiments of the present invention provide a nonvolatile memory and an electronic device, which can encrypt data stored in a nonvolatile memory to increase security of data stored in the nonvolatile memory.

According to a first aspect, a nonvolatile memory is provided, where the nonvolatile memory includes a bank decoder and at least two banks, and the bank includes a storage array, a row decoder of the storage array, and a column decoder of the storage array. The nonvolatile memory further includes a random number generator and $n_1$ first exchangers disposed between a first signal generator and a first decoder of the bank decoder, and one of the first exchangers corresponds to one bank address subsignal of the bank decoder, where:

the random number generator is configured to: when the nonvolatile memory is powered on, randomly generate a selection signal for each first exchanger and send the generated selection signal to a first exchanger corresponding to the selection signal; and the $i_1^{th}$ first exchanger of the bank decoder is configured to: receive the $i_2^{th}$ bank address subsignal corresponding to the $i_1^{th}$ first exchanger and an inverted signal of the $i_2^{th}$ bank address subsignal; when a received selection signal is a first signal, output the $i_2^{th}$ bank address subsignal as the $i_2^{th}$ bank address subsignal to the first decoder and output the inverted signal of the $i_2^{th}$ bank address subsignal as the inverted signal of the $i_2^{th}$ bank address subsignal to the first decoder; when the received selection signal is a second signal, output the inverted signal of the $i_2^{th}$ bank address subsignal as the $i_2^{th}$ bank address subsignal to the first decoder and output the $i_2^{th}$ bank address subsignal as the inverted signal of the $i_2^{th}$ bank address subsignal to the first decoder; and $1 \leq i_1 \leq n_1$, $1 \leq i_2 \leq m_1$, and $1 \leq n_1 \leq m_1$, where $m_1$ is a total number of bank address subsignals.

With reference to the first aspect, in a first implementation manner of the first aspect, at least one bank further includes: $n_2$ second exchangers disposed between a second signal generator and a second decoder of a row decoder, and one second exchanger corresponds to one row address subsignal of the row decoder, where:

the random number generator is further configured to: when the nonvolatile memory is powered on, randomly generate a selection signal for each second exchanger and send the generated selection signal to a second exchanger corresponding to the selection signal; and the $j_1^{th}$ second exchanger $j_1$ of each bank is configured to: receive the $j_2^{th}$ row address subsignal corresponding to the $j_1^{th}$ second exchanger and an inverted signal of the $j_2^{th}$ row address subsignal; when a received selection signal is a third signal, output the $j_2^{th}$ row address subsignal as the $j_2^{th}$ row address subsignal to the second decoder and output the inverted signal of the $j_2^{th}$ row address subsignal as the inverted signal of the $j_2^{th}$ row address subsignal to the second decoder; when the received selection signal is a fourth signal, output the inverted signal of the $j_2^{th}$ row address subsignal as the $j_2^{th}$ row address subsignal to the second decoder and output the $j_2^{th}$ row address subsignal as the inverted signal of the $j_2^{th}$ row address subsignal to the second decoder; and $1 \leq j_1 \leq n_2$, $1 \leq j_2 \leq m_2$, and $1 \leq n_2 \leq m_2$, where $m_2$ is a total number of row address subsignals of a row decoder to which the $j_1^{th}$ second exchanger belongs.

With reference to the first aspect, in a second implementation manner of the first aspect, at least one bank further includes: $n_3$ third exchangers disposed between a third signal generator and a third decoder of a column decoder, and one third exchanger corresponds to one column address subsignal of the column decoder, where:

the random number generator is further configured to: when the nonvolatile memory is powered on, randomly generate a selection signal for each third exchanger and send the generated selection signal to a third exchanger corresponding to the selection signal; and the $k_1{}^{th}$ third exchanger of each bank is configured to: receive the $k_2{}^{th}$ column address subsignal corresponding to the $k_1{}^{th}$ third exchanger and an inverted signal of the $k_2{}^{th}$ column address subsignal; when a received selection signal is a fifth signal, output the $k_2{}^{th}$ column address subsignal as the $k_2{}^{th}$ column address subsignal to the third decoder and output the inverted signal of the $k_2{}^{th}$ column address subsignal as the inverted signal of the $k_2{}^{th}$ column address subsignal to the third decoder; when the received selection signal is a sixth signal, output the inverted signal of the $k_2{}^{th}$ column address subsignal as the $k_2{}^{th}$ column address subsignal to the third decoder and output the $k_2{}^{th}$ column address subsignal as the inverted signal of the $k_2{}^{th}$ column address subsignal to the third decoder; and $1 \le k_1 \le n_3$, $1 \le k_2 \le m_3$, and $1 \le n_3 \le m_3$, where $m_3$ is a total number of column address subsignals of a column decoder to which the $k_1{}^{th}$ third exchanger belongs.

With reference to the first implementation manner of the first aspect, in a third implementation manner of the first aspect, the at least one bank further includes: $n_3$ third exchangers disposed between a third signal generator and a third decoder of a column decoder, and one third exchanger corresponds to one column address subsignal of the column decoder, where:

the random number generator is further configured to: when the nonvolatile memory is powered on, randomly generate a selection signal for each third exchanger and send the generated selection signal to a third exchanger corresponding to the selection signal; and the $k_1{}^{th}$ third exchanger of each bank is configured to: receive the $k_2{}^{th}$ column address subsignal corresponding to the $k_1{}^{th}$ third exchanger and an inverted signal of the $k_2{}^{th}$ column address subsignal; when a received selection signal is a fifth signal, output the $k_2{}^{th}$ column address subsignal as the $k_2{}^{th}$ column address subsignal to the third decoder and output the inverted signal of the $k_2{}^{th}$ column address subsignal as the inverted signal of the $k_2{}^{th}$ column address subsignal to the third decoder; when the received selection signal is a sixth signal, output the inverted signal of the $k_2{}^{th}$ column address subsignal as the $k_2{}^{th}$ column address subsignal to the third decoder and output the $k_2{}^{th}$ column address subsignal as the inverted signal of the $k_2{}^{th}$ column address subsignal to the third decoder; and $1 \le k_1 \le n_3$, $1 \le k_2 \le m_3$, and $1 \le n_3 \le m_3$, where $m_3$ is a total number of column address subsignals of a column decoder to which the $k_1{}^{th}$ third exchanger belongs.

With reference to the first aspect, in a fourth implementation manner of the first aspect, the random number generator includes a linear feedback shift register that has at least $n_1$ bits, and a signal obtained after exclusive OR processing is performed on any two bits of the linear feedback shift register is used as a shift input signal of the linear feedback shift register; and the $n_1$ first exchangers correspond to one bit of the linear feedback shift register separately and a corresponding bit is used as a selection signal sent by the random number generator.

With reference to the first implementation manner of the first aspect, in a fifth implementation manner of the first aspect, the random number generator includes a linear feedback shift register that has at least $N_1$ bits, and a signal obtained after exclusive OR processing is performed on any two bits of the linear feedback shift register is used as a shift input signal of the linear feedback shift register; $N_1$ is a total number of first exchangers and second exchangers included in the nonvolatile memory; and each of the first exchangers and each of the second exchangers correspond to one bit of the linear feedback shift register separately and a corresponding bit is used as a selection signal sent by the random number generator.

With reference to the second implementation manner of the first aspect, in a sixth implementation manner of the first aspect, the random number generator includes a linear feedback shift register that has at least $N_2$ bits, and a signal obtained after exclusive OR processing is performed on any two bits of the linear feedback shift register is used as a shift input signal of the linear feedback shift register; $N_2$ is the total number of first exchangers and third exchangers included in the nonvolatile memory; and each of the first exchangers and each of the third exchangers correspond to one bit of the linear feedback shift register separately and a corresponding bit is used as a selection signal sent by the random number generator.

With reference to the third implementation manner of the first aspect, in a seventh implementation manner of the first aspect, the random number generator includes a linear feedback shift register that has at least $N_3$ bits, and a signal obtained after exclusive OR processing is performed on any two bits of the linear feedback shift register is used as a shift input signal of the linear feedback shift register; $N_3$ is a total number of first exchangers, second exchangers, and third exchangers included in the nonvolatile memory; and each of the first exchangers, each of the second exchangers, and each of the third exchangers correspond to one bit of the linear feedback shift register separately and a corresponding bit is used as a selection signal sent by the random number generator.

According to a second aspect, a nonvolatile memory is provided, where the nonvolatile memory includes at least one bank and each bank includes a storage array, a row decoder of the storage array, and a column decoder of the storage array. The nonvolatile memory further includes a random number generator, the at least one bank further includes $n_2$ second exchangers disposed between a second signal generator and a second decoder of a row decoder, and one second exchanger corresponds to one row address subsignal of the row decoder, where:

the random number generator is configured to: when the nonvolatile memory is powered on, randomly generate a selection signal for each second exchanger and send the generated selection signal to a second exchanger corresponding to the selection signal; and the $j_1{}^{th}$ second exchanger of each bank is configured to receive the $j_2{}^{th}$ row address subsignal corresponding to the $j_1{}^{th}$ second exchanger and an inverted signal of the $j_2{}^{th}$ row address subsignal; when a received selection signal is a third signal, output the $j_2{}^{th}$ row address subsignal as the $j_2{}^{th}$ row address subsignal to the second decoder and output the inverted signal of the $j_2{}^{th}$ row address subsignal as the inverted signal of the $j_2{}^{th}$ row address subsignal to the second decoder; when the received selection signal is a fourth signal, output the inverted signal of the $j_2{}^{th}$ row address subsignal as the $j_2{}^{th}$ row address subsignal to the second decoder and output the $j_2{}^{th}$ row address subsignal as the inverted signal of the $j_2{}^{th}$ row address subsignal to the second decoder; and $1 \le j_1 \le n_2$, $1 \le j_2 \le m_2$, and $1 \le n_2 \le m_2$, where $m_2$ is a total number of row address subsignals of a row decoder to which the $j_1{}^{th}$ second exchanger belongs.

With reference to the second aspect, in a first implementation manner of the second aspect, the at least one bank further includes: $n_3$ third exchangers disposed between a third signal generator and a third decoder of a column decoder, and one third exchanger corresponds to one column address subsignal of the column decoder, where:

the random number generator is further configured to: when the nonvolatile memory is powered on, randomly generate a selection signal for each third exchanger and send the generated selection signal to a third exchanger corresponding to the selection signal; and the $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal is a fifth signal, output the $k_2^{th}$ column address subsignal as the $k_2^{th}$ column address subsignal to the third decoder and output the inverted signal of the $k_2^{th}$ column address subsignal as the inverted signal of the $k_2^{th}$ column address subsignal to the third decoder; when the received selection signal is a sixth signal, output the inverted signal of the $k_2^{th}$ column address subsignal as the $k_2^{th}$ column address subsignal to the third decoder and output the $k_2^{th}$ column address subsignal as the inverted signal of the $k_2^{th}$ column address subsignal to the third decoder; and $1 \le k_1 \le n_3$, $1 \le k_2 \le m_3$, and $1 \le n_3 \le m_3$, where $m_3$ is a total number of column address subsignals of a column decoder to which the $k_1^{th}$ third exchanger belongs.

With reference to the second aspect, in a second implementation manner of the second aspect, the random number generator includes a linear feedback shift register that has at least $N_4$ bits, and a signal obtained after exclusive OR processing is performed on any two bits of the linear feedback shift register is used as a shift input signal of the linear feedback shift register; $N_4$ is a total number of second exchangers included in the nonvolatile memory; and each of the second exchangers corresponds to one bit of the linear feedback shift register separately and a corresponding bit is used as a selection signal sent by the random number generator.

With reference to the first implementation manner of the second aspect, in a third implementation manner of the second aspect, the random number generator includes a linear feedback shift register that has at least $N_5$ bits, and a signal obtained after exclusive OR processing is performed on any two bits of the linear feedback shift register is used as a shift input signal of the linear feedback shift register; $N_5$ is a total number of second exchangers and third exchangers included in the nonvolatile memory; and each of the second exchangers and each of the third exchangers correspond to one bit of the linear feedback shift register separately and a corresponding bit is used as a selection signal sent by the random number generator.

According to a third aspect, a nonvolatile memory is provided, where the nonvolatile memory includes at least one bank, and each bank includes a storage array, a row decoder of the storage array, and a column decoder of the storage array. The nonvolatile memory further includes a random number generator, the at least one bank further includes $n_3$ third exchangers disposed between a third signal generator and a third decoder of a column decoder, and one third exchanger corresponds to one column address sub signal of the column decoder, where:

the random number generator is configured to, when the nonvolatile memory is powered on, randomly generate a selection signal for each third exchanger and send the generated selection signal to a third exchanger corresponding to the selection signal;

the $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal is a fifth signal, output the $k_2^{th}$ column address subsignal as the $k_2^{th}$ column address subsignal to the third decoder and output the inverted signal of the $k_2^{th}$ column address subsignal as the inverted signal of the $k_2^{th}$ column address subsignal to the third decoder; when the received selection signal is a sixth signal, output the inverted signal of the $k_2^{th}$ column address subsignal as the $k_2^{th}$ column address subsignal to the third decoder and output the $k_2^{th}$ column address subsignal as the inverted signal of the $k_2^{th}$ column address subsignal to the third decoder; and $1 \le k_1 \le n_3$, $1 \le k_2 \le m_3$, and $1 \le n_3 \le m_3$, where $m_3$ is a total number of column address subsignals of a column decoder to which the $k_1^{th}$ third exchanger belongs.

With reference to the third aspect, in a first implementation manner of the third aspect, the random number generator includes a linear feedback shift register that has at least $N_6$ bits, and a signal obtained after exclusive OR processing is performed on any two bits of the linear feedback shift register is used as a shift input signal of the linear feedback shift register; $N_6$ is a total number of third exchangers included in the nonvolatile memory; and each of the third exchangers corresponds to one bit of the linear feedback shift register separately and a corresponding bit is used as a selection signal sent by the random number generator.

According to a fourth aspect, an electronic device is provided and includes a nonvolatile memory according to any one of the foregoing aspects.

The nonvolatile memory in this embodiment includes a bank decoder and at least two banks, the bank includes a storage array, a row decoder of the storage array, and a column decoder of the storage array, and the nonvolatile memory further includes a random number generator and $n_1$ first exchangers disposed between a first signal generator and a first decoder of the bank decoder, where one first exchanger corresponds to one bank address subsignal of the bank decoder, and the random number generator is configured to: when the nonvolatile memory is powered on, randomly generate a selection signal for each first exchanger and send the generated selection signal to a corresponding first exchanger; the $i_1^{th}$ first exchanger of the bank decoder is configured to receive the $i_2^{th}$ bank address subsignal corresponding to the $i_1^{th}$ first exchanger and an inverted signal of the $i_2^{th}$ bank address subsignal; when a received selection signal is a first signal, output the $i_2^{th}$ bank address subsignal as the $i_2^{th}$ bank address subsignal to the first decoder and output the inverted signal of the $i_2^{th}$ bank address subsignal as the inverted signal of the $i_2^{th}$ bank address subsignal to the first decoder; when the received selection signal is a second signal, output the inverted signal of the $i_2^{th}$ bank address subsignal as the $i_2^{th}$ bank address subsignal to the first decoder and output the $i_2^{th}$ bank address subsignal as the inverted signal of the $i_2^{th}$ bank address subsignal to the first decoder; and $1 \le i_1 \le n_1$, $1 \le i_2 \le m_1$, and $1 \le n_1 \le m_1$, where $m_1$ is a total number of bank address subsignals. In this embodiment, when a nonvolatile memory is powered on, a random number generator generates a selection signal to control each first exchanger in a bank decoder to keep a corresponding bank address subsignal and its inverted signal unchanged or exchange the corresponding bank address subsignal and the inverted signal of the bank address subsignal. Because the random number generator generates selection signals randomly, after the nonvolatile memory is powered off and then powered on, a same bank address subsignal corresponds to different bank gating signals compared with the nonvolatile memory before the power-off, which disarranges data, stored before the nonvolatile memory is powered off, when the nonvolatile memory is powered off and then powered on, so as to achieve an encrypting effect. As a result, the data stored in the nonvolatile memory cannot be sequentially read from original storage addresses, and other persons cannot obtain original data even if they use a software tool to directly read the data stored in the nonvolatile memory and it is difficult for them to recover the original data from the data stored in the nonvolatile memory, which ensures security of the data stored in the nonvolatile memory.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
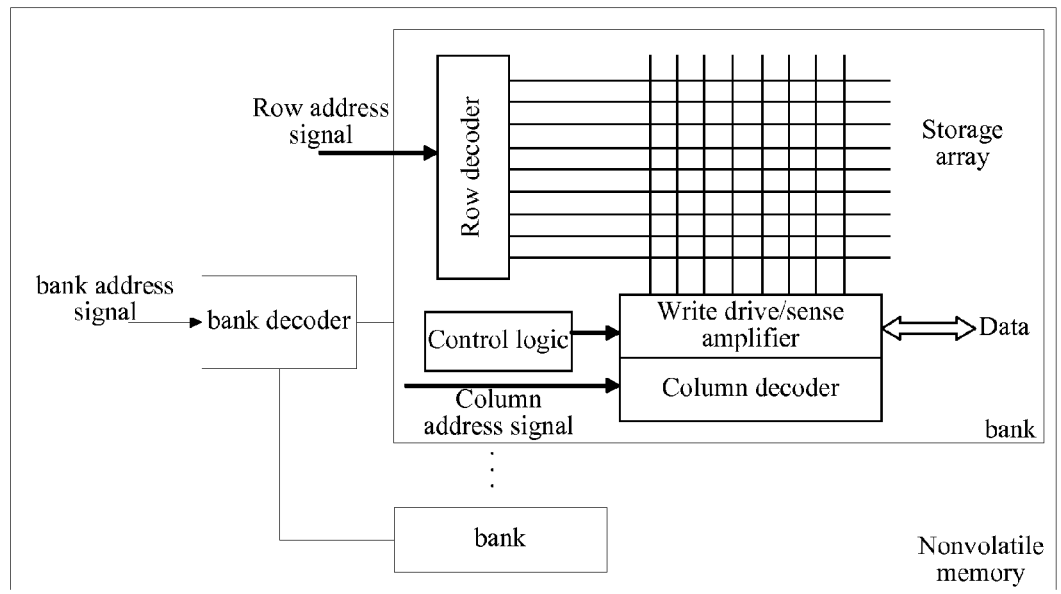
FIG. 1 is a schematic structural diagram of a nonvolatile memory in the prior art.

Referring to FIG. 1, FIG. 1 is a schematic structural diagram of a nonvolatile memory in the prior art, where the nonvolatile memory includes at least one bank and a bank decoder, and each bank includes a storage array, a row decoder of the storage array, and a column decoder of the storage array. FIG. 1 shows a structure of one bank. Structures of other banks are the same as this structure and not described in detail herein. The storage array is a large number of storage units which are arranged in rows and columns to form a matrix. Each row of storage units has a row gating signal and one row of storage units is selected each time by using a row gating signal. Each column of storage units has one column gating signal and one column of storage units is selected each time by using a column gating signal. Data written into or read from the storage array is input and output by using a bit line.

The bank decoder is configured to generate a bank gating signal according to a bank address signal input by a controller of the nonvolatile memory and select a bank indicated by the bank address signal so as to perform read or write access on the selected bank. Generally, a bank decoder is disposed in a nonvolatile memory only when the nonvolatile memory includes at least two banks. If a nonvolatile memory includes only one bank, no bank decoder is required. Generally, a bank address consists of at least 1-bit binary code. When a bank address signal is generated according to a bank address, each bit of binary code corresponds to one address subsignal, and therefore, the number of bits in the binary code equals the number of address subsignals included in the bank address signal. For example, a bank address BA[0:1] indicates that the bank address includes two address subsignals. Similarly, row address signals and column address signals described in the following include several row address subsignals and several column address subsignals respectively.

A row decoder of each bank is configured to generate a row gating signal according to a row address signal input by a controller of the nonvolatile memory and select one row of storage units, from a storage array of a bank to which the row decoder belongs, indicated by the row address signal to perform read or write access.

A column decoder of each bank is configured to generate a column gating signal according to a column address signal input by the controller of the nonvolatile memory and select one column of storage units, from the storage array of the bank to which the column decoder belongs, indicated by the column address signal to perform the read or write access.

A storage unit in a bank can be selected when a bank is selected according to a bank decoder and one row of storage units and one column of storage units in the bank are selected respectively according to a row decoder and a column decoder. In this manner, a storage unit can be selected for read and write access.

Certainly, as shown in FIG. 1, in an actual application, each bank may further include other structures, such as control logic, a write drive, and a sense amplifier, which are not limited by the embodiment of the present invention. The control logic is generally used to: according to a chip select or read/write signal provided by an external component of the nonvolatile memory, such as the controller of the nonvolatile memory, control the write drive to perform write access on the storage array, or control the sense amplifier to perform read access on the storage array; and the write drive is generally used to store to-be-written data sent by the controller of the nonvolatile memory in a storage unit selected by the row decoder and the column decoder, and specifically, the data can be sent to the storage unit according to a write pulse signal of a waveform generated corresponding to that the data to be written to the storage unit is 0 or 1; and the sense amplifier is generally used to read data stored in a storage unit selected by the row decoder and the column decoder, amplify the read data, and transmit it to the controller of the nonvolatile memory.

The bank decoder, row decoder, and column decoder can be implemented by using address decoders.

An address decoder is a common digital logic circuit. The address decoder can, according to different input signal combinations, select one output signal from multiple output signals and set it to be of an effective level, and leave other output signals invalid. A relation between the number of output signals n, and the number of input signals m of the address decoder is: $n=2^m$, where m and n are natural numbers. When a bank decoder is implemented by using the address decoder, the bank address signal is used as an input signal of the address decoder and an output signal of the address decoder is used as the bank gating signal. The implementation of a row decoder and the implementation of a column decoder are similar to this, and details are not described herein again.

The following describes implementation principles of the address decoder. Here, a 3-to-8 line address decoder is used as an example, where the 3-to-8 line address decoder is formed by eight AND circuits and three phase inverters. Each of the three phase inverters corresponds to one input signal of the address decoder and is used to generate an inverted signal for the corresponding input signal. The eight AND circuits are used to generate an output signal according to an input signal and an inverted signal of the input signal. The 3-to-8 line address decoder has three input signals, which are A2, A1, and A0, and eight output signals, which are Q7 to Q0. It is assumed that an output higher level is of an effective level and is indicated by 1. Logical relations between the input signals and the output signals are as follows:

Q0=/A2*/A1*/A0, where, when A2A1A0=000, Q0 is 1, and otherwise it is 0;

Q1=/A2*/A1*A0, where, when A2A1A0=001, Q1 is 1, and otherwise it is 0;

Q2=/A2*A1*/A0, where, when A2A1A0=010, Q2 is 1, and otherwise it is 0;

Q3=/A2*A1*A0, where, when A2A1A0=011, Q3 is 1, and otherwise it is 0;

Q4=A2*/A1*/A0, where, when A2A1A0=100, Q4 is 1, and otherwise it is 0;

Q5=A2*/A1*A0, where, when A2A1A0=101, Q5 is 1, and otherwise it is 0;

Q6=A2*A1*/A0, where, when A2A1A0=110, Q6 is 1, and otherwise it is 0; and

Q7=A2*A1*A0, where, when A2A1A0=111, Q7 is 1, otherwise it is 0;

/A indicates reverse of A, for example, when A=0, /A=1 and when A=1, /A=0. A symbol * indicates a logical AND operation.

It can be learnt from the foregoing expressions that three input signals correspond to eight expressions. If A2A1A0=000, Q0=1 and other outputs are 0; if A2A1A0=001, Q1=1; and so on.

Figure 2:
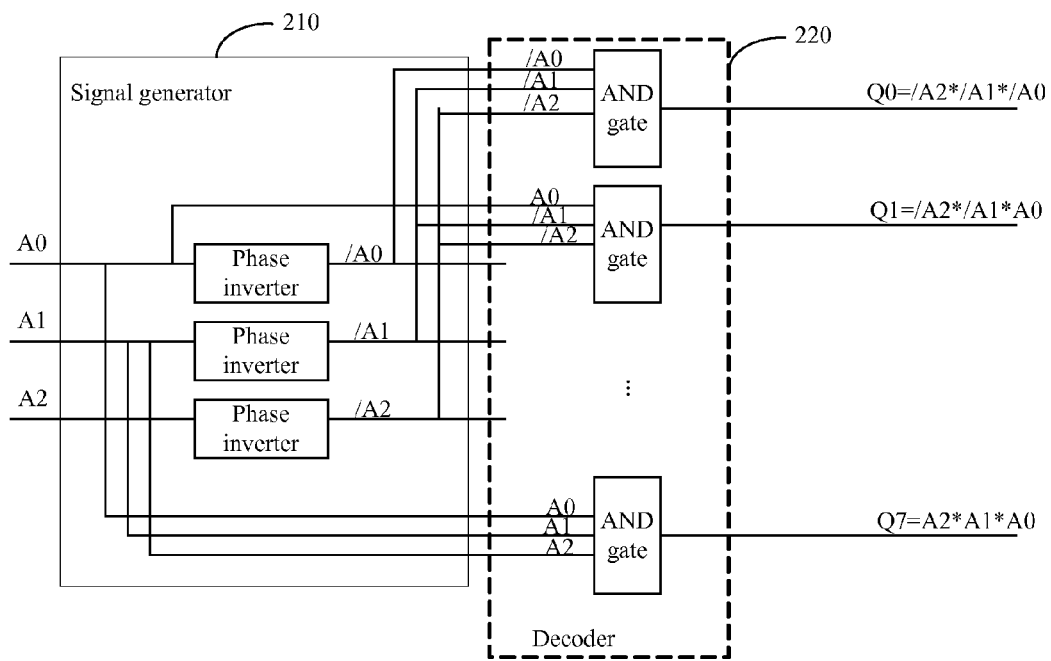
FIG. 2 is a schematic structural diagram of a 3-to-8 line address decoder in the prior art.

The foregoing are circuits and logical relations of the 3-to-8 line address decoder. Other address decoders have same implementation principles, which are not described in detail herein again. In addition, for conciseness of the following description of embodiments of the present invention, an address decoder in an embodiment of the present invention is divided into a signal generator and a decoder, where:

the signal generator is used to receive an input signal of the address decoder, output the input signal of the address decoder and an inverted signal of the input signal to the decoder, as shown in a part 210 of the 3-to-8 line address decoder in FIG. 2; and the decoder is used to generate an output signal of the address decoder according to the input signal of the address decoder and the inverted signal of the input signal, as shown in a part 220 of the 3-to-8 line address decoder in FIG. 2.

Based on the foregoing implementation structure of a nonvolatile memory in the prior art, a nonvolatile memory provided in the present invention implements encryption of data stored in the nonvolatile memory by embedding a random number generator and exchangers, so that it is difficult to recover original data from the encrypted data, which increase security of the data stored in the nonvolatile memory.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The following first describes principles of encrypting data stored in the nonvolatile memory according to an embodiment of the present invention. In this description, the foregoing 3-to-8 line address decoder is still used as an example. If the 3-to-8 line address decoder is used as a row decoder of a storage array, eight output signals Q7 to Q0 of the 3-to-8 line address decoder can be used as row gating signals. If row sequence numbers begin with 0, when A2A1A0=000, row 0 of the storage array is selected; and when A2A1A0=001, row 1 of the storage array is selected; if A0 and /A0 in expressions of Q0 and Q1 are exchanged, when A2A1A0=000, row 1 of the storage array is selected; and when A2A1A0=001, row 0 of the storage array is selected, which is equivalent to that row 0 and row 1 are exchanged. If such exchange occurs simultaneously on A2, A1, and A0, expressions are changed into:

Q0=A2*A1*A0, where, when A2A1A0=111, Q0 is 1, and otherwise it is 0;

Q1=A2*A1*/A0, where, when A2A1A0=110, Q1 is 1, and otherwise it is 0;

Q2=A2*/A1*A0, where, when A2A1A0=101, Q2 is 1, and otherwise it is 0;

Q3=A2*/A1*/A0, where, when A2A1A0=100, Q3 is 1, and otherwise it is 0;

Q4=/A2*A1*A0, where, when A2A1A0=011, Q4 is 1, and otherwise it is 0;

Q5=/A2*A1*/A0, where, when A2A1A0=010, Q5 is 1, and otherwise it is 0;

Q6=/A2*/A1*A0, where, when A2A1A0=001, Q6 is 1, and otherwise it is 0; and

Q7=/A2*/A1*/A0, where, when A2A1A0=000, Q7 is 1, and otherwise it is 0.

It can be learnt from comparison of the two groups of expressions that Q7 and Q0 are exchanged, Q6 and Q1 are exchanged, and so on. Because Q7 to Q0 are row gating signals, a result of such exchange is: an external component, such as a controller, of a nonvolatile memory provides an address of row 0 of the storage array, but the nonvolatile memory actually selects row 7 of the storage array; the controller provides an address of row 1 of the storage array, but the nonvolatile memory actually selects row 6 of the storage array, and so on. If such exchange between A and /A occurs randomly, for example, A2 and /A2 are exchanged but A1 and /A1 are not exchanged, and such exchange is performed on at least one of a bank address, row address, and column address in the nonvolatile memory each time the nonvolatile memory is powered on, after data output by the controller to the nonvolatile memory is stored by the nonvolatile memory, a same bank address subsignal corresponds to different bank gating signals before and after the nonvolatile memory is powered off and then powered on, which causes that data stored before the nonvolatile memory is powered off is disarranged when the nonvolatile memory is powered off and then powered on, and that the data stored in the nonvolatile memory cannot be read sequentially from original storage addresses, so as to achieve an encrypting effect. An example is provided as follows:

If a nonvolatile memory in the prior art saves four English words before being powered off separately in rows 1 to 4 of a storage array, where the first row is DATA, the second row is WORD, the third row is CODE, and the fourth row is PRAM, storage location relations of data in the storage array are shown in Table 1 below:

TABLE 1

|  | Column 1 | Column 2 | Column 3 | Column 4 |
|---|---|---|---|---|
| Row 1 | D | A | T | A |
| Row 2 | W | O | R | D |
| Row 3 | C | O | D | E |
| Row 4 | P | R | A | M |

When the nonvolatile memory in the present invention is powered off and then powered on, if row 1 and row 4 are exchanged, and row 2 and row 3 are exchanged, the storage location relations are changed into storage location relations shown in Table 2 below:

TABLE 2

|  | Column 1 | Column 2 | Column 3 | Column 4 |
|---|---|---|---|---|
| Row 1 | P | R | A | M |
| Row 2 | C | O | D | E |
| Row 3 | W | O | R | D |
| Row 4 | D | A | T | A |

Based on Table 2, if the nonvolatile memory in the present invention further exchanges column 1 and column 4, and exchanges column 2 and column 3, the storage location relations are finally changed into storage location relations shown in Table 3 below:

TABLE 3

|  | Column 1 | Column 2 | Column 3 | Column 4 |
|---|---|---|---|---|
| Row 1 | M | A | R | P |
| Row 2 | E | D | O | C |
| Row 3 | D | R | O | W |
| Row 4 | A | T | A | D |

When a person wants to directly read data stored in the storage array of the nonvolatile memory, data in each row is sequentially read according to addresses of the storage array, which are MARP, EDOC, DROW, and ATAD. It is difficult to parse what data is actually stored in the nonvolatile memory, which achieves an effect of encrypting the data stored in the nonvolatile memory. In particular, at least one bank is disposed in a commonly used nonvolatile memory and each bank includes thousands of rows and columns. If part or all of banks and/or rows and/or columns are exchanged to change the storage locations and sequence of data stored, data read sequentially from the nonvolatile memory has very low correlation and it is very difficult to recover original data. This encryption method changes only storage locations and storage sequences of data and does not change the data itself, which is similar to card shuffling.

The following further discusses how to use circuits to implement such exchange. The 3-to-8 line address decoder shown in FIG. 2 is still used as an example for description. The 3-to-8 line address decoder is a combinational logic circuit, and is formed by eight AND circuits and three phase inverters, which is shown in FIG. 2.

Figure 2A:
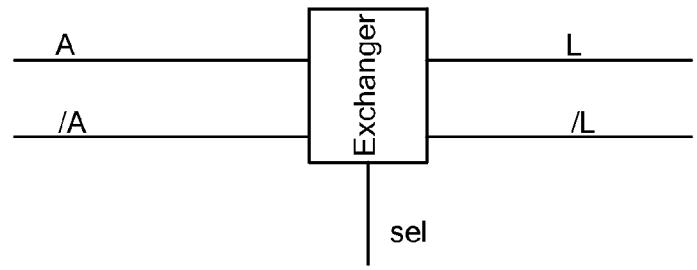
FIG. 2A is a schematic structural diagram of an exchanger according to an embodiment of the present invention.

To implement exchanges between A0 and /A0, A1 and /A1, and A2 and /A2, an exchanger structure shown in FIG. 2A may be used. That input signals are A and /A is used as an example to describe implementation principles of the exchanger. If input signals of the exchanger are A, /A, and sel, and output signals are L and /L, where sel is a selection signal used to determine logical functions of circuits.

When sel=0, L=A and /L=/A, which is a pass-through mode of the exchanger;

when sel=1, L=/A and /L=A, which is an exchange mode of the exchanger; and if sel is changed randomly, L and /L may be equal to A or /A randomly.

Figure 2B:
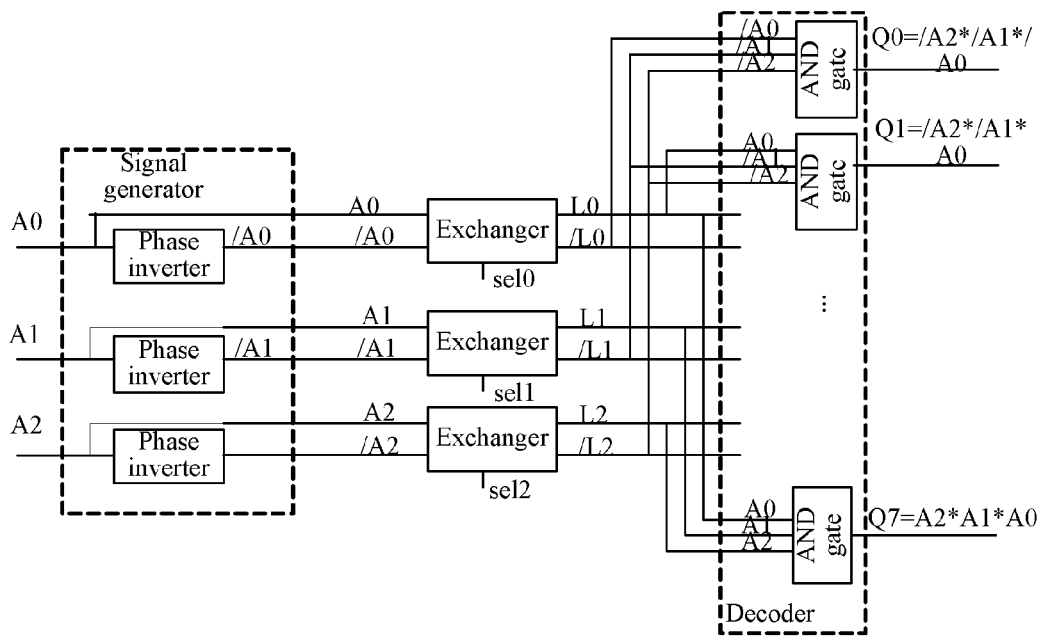
FIG. 2B is a schematic structural diagram of a 3-to-8 line address decoder on which an exchanger is disposed according to an embodiment of the present invention.

As shown in FIG. 2B, three exchangers are disposed between a signal generator and a decoder of a 3-to-8 line address decoder. L0 replaces A0, /L0 replaces /A0, L1 replaces A1, /L1 replaces /A1, L2 replaces A2, and /L2 replaces /A2. In this case, exchanges between A0 and /A0, A1 and /A1, and A2 and /A2 are implemented. In addition, in an actual application, two or one exchanger may be disposed instead of three exchangers to implement exchange between any two pairs or one pair of A0 and /A0, A1 and /A1, and A2 and /A2, which are input signals and their inverted signals. This may also achieve a certain encrypting effect. Certainly, if a corresponding exchanger is set for each pair of input signal and its inverted signal, the encrypting effect may be optimal.

Figure 2C:
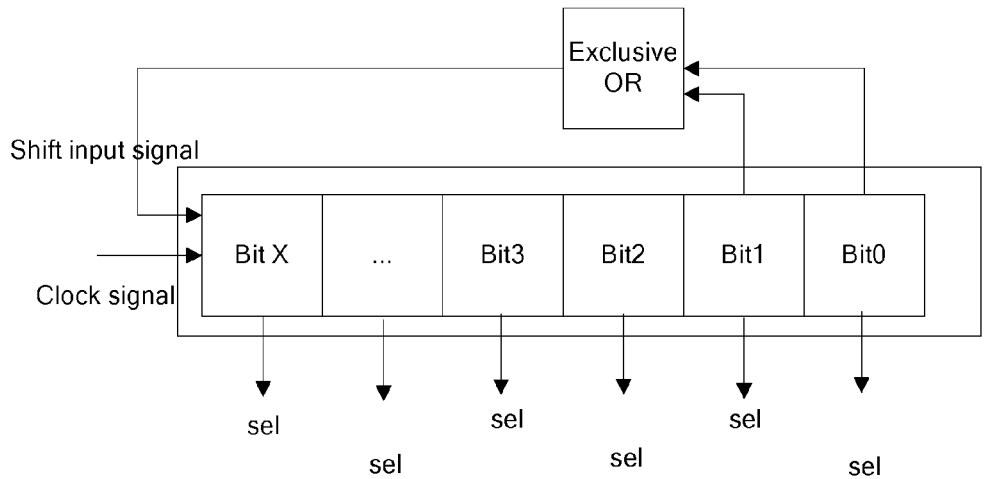
FIG. 2C is a schematic structural diagram of a pseudorandom sequence generator according to an embodiment of the present invention.

In addition, to enable a selection signal sel of the exchanger, such as selection signals sel2, sel1, and sel0 of three exchangers in FIG. 2B, to change randomly, a random number generator may be disposed and a bit randomly generated by the random number generator is used as the selection signal. There are many methods for implementing the random number generator. For example, a pseudo-random sequence generator shown in FIG. 2C may be used. The pseudo-random sequence generator implements the random number generator by using a linear feedback shift register. A specific method is to use a signal, obtained after exclusive OR processing is performed on two bits such as the least significant bit and one bit in the middle of a linear feedback shift register, as a shift input signal. In this case, random data is generated after multiple shifts controlled by a clock signal. The number of bits X of the linear feedback shift register may be set according to an actual application environment.

The following describes implementation of a nonvolatile memory provided in embodiments of the present invention based on the foregoing implementation principles proposed by the foregoing inventor and with reference to the accompanying drawings.

In a first embodiment of a nonvolatile memory according to the present invention, a nonvolatile memory is provided. The nonvolatile memory includes at least two banks and a bank decoder, and each bank includes a storage array, a row decoder of the storage array, and a column decoder of the storage array. The nonvolatile memory further includes: a random number generator and $n_1$ first exchangers disposed between a first signal generator and a first decoder of the bank decoder, and one first exchanger corresponds to one bank address subsignal of the bank decoder, where the random number generator is configured to: when the nonvolatile memory is powered on, randomly generate a selection signal for each first exchanger and send the generated selection signal to a corresponding first exchanger.

The $i_1^{th}$ first exchanger of each bank decoder is configured to: receive the $i_2^{th}$ bank address subsignal corresponding to the $i_1^{th}$ first exchanger and an inverted signal of the $i_2^{th}$ bank address subsignal; when a received selection signal sent by the random number generator is a first signal, output the $i_2^{th}$ bank address subsignal as the $i_2^{th}$ bank address subsignal of the bank decoder to the first decoder and output the inverted signal of the $i_2^{th}$ bank address subsignal as the inverted signal of the $i_2^{th}$ bank address subsignal of the bank decoder to the first decoder; when the received selection signal sent by the random number generator is a second signal, output the inverted signal of the $i_2^{th}$ bank address subsignal as the $i_2^{th}$ bank address subsignal of the bank decoder to the first decoder and output the $i_2^{th}$ bank address subsignal as the inverted signal of the $i_2^{th}$ bank address subsignal of the bank decoder to the first decoder; and $1 \leq i_1 \leq n_1$, $1 \leq i_2 \leq m_1$, and $1 \leq m \leq m_1$, where $m_1$ is a total number of bank address subsignals, and $i_1$ and $i_2$ may be equal or unequal.

A total number of first exchangers $n_1$ may be smaller than a total number of input signals of the bank decoder, that is, a total number of bank address subsignals $m_1$. In this case, only $n_1$ bank address subsignals and their inverted signals have corresponding first exchangers; the total number of first exchangers $n_1$ may also be equal to the total number of input signals of the bank decoder, that is, the total number of bank address subsignals $m_1$. In this case, each bank address subsignal and its inverted signal have a corresponding first exchanger. The embodiment of the present invention achieves a better encrypting effect if a value of $n_1$ is closer to $m_1$.

The first signal in the embodiment of the present invention may be a high-level signal, and the second signal may correspondingly be a low-level signal; or the first signal may be a low-level signal, and the second signal may correspondingly be a high-level signal.

The random number generator may include: a linear feedback shift register that has at least $n_1$ bits, where a signal obtained after exclusive OR processing is performed on any two bits of the linear feedback shift register is used as a shift input signal of the linear feedback shift register;

$n_1$ first exchangers correspond to one bit of the linear feedback shift register separately and a corresponding bit is used as a selection signal sent by the random number generator.

Figure 3:
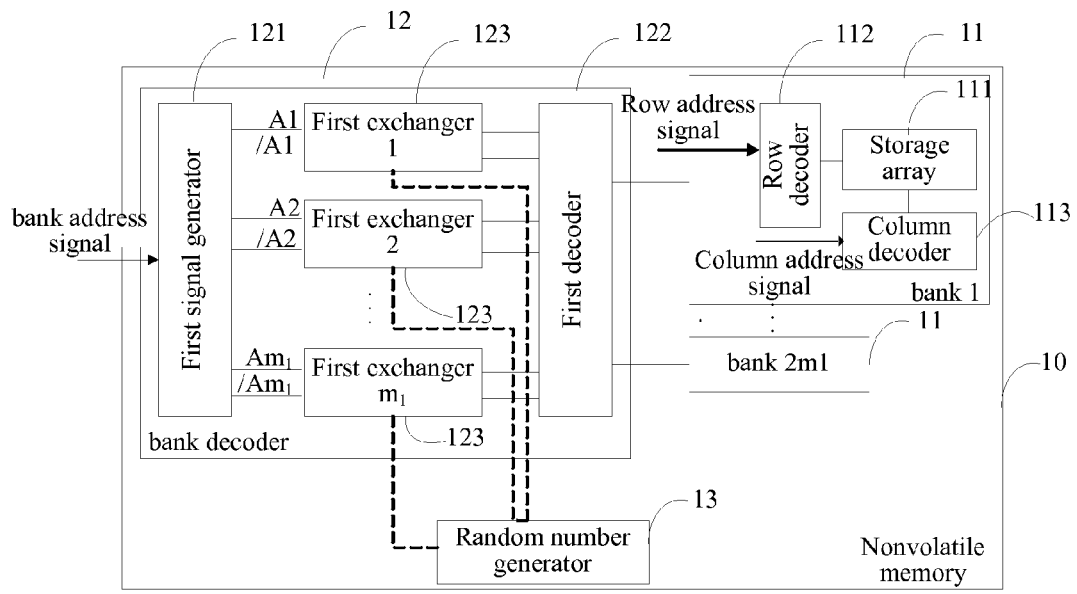
FIG. 3 is a structural diagram of an instance of a first embodiment of a nonvolatile memory according to the present invention.

FIG. 3 describe a specific implementation structure of the nonvolatile memory in the first embodiment by using an example, in which a nonvolatile memory includes $2^{m_1}$ banks, a bank decoder is implemented by using a $m_1$-$2^{m_1}$ line address decoder, $n_1 = m_1$, and first exchangers correspond to bank address subsignals sequentially, that is, $i_1 = i_2$.

Refer to FIG. 3. A nonvolatile memory 10 includes $2^{m_1}$ banks 11 and a bank decoder 12, and each bank 11 includes a storage array 111, a row decoder 112 of the storage array, and a column decoder 113 of the storage array. FIG. 3 shows a structure of only one bank 11 but does not show structures of other banks 11. The nonvolatile memory further includes: a random number generator 13 and $m_1$ first exchangers 123 disposed between a first signal generator 121 and a first decoder 122 of the bank decoder 12, and one first exchanger 123 corresponds to one bank address subsignal of the bank decoder 12, where:

the random number generator 13 is configured to: when the nonvolatile memory 10 is powered on, randomly generate a selection signal for each first exchanger 123 and send the generated selection signal to a corresponding first exchanger 123.

The first signal generator 121 outputs each bank address subsignal and its inverted signal to a corresponding first exchanger 123; specifically, the first signal generator 121 sends a first bank address subsignal A1 and its inverted signal /A1 to the first first exchanger, sends a second bank address subsignal A2 and its inverted signal /A2 to the second first exchanger, . . . , and sends the $m_1^{th}$ bank address subsignal Arm and its inverted signal /Arm to the $m_1^{th}$ first exchanger.

The $i_1^{th}$ first exchanger 123 is configured to: receive the $i_1^{th}$ bank address subsignal corresponding to the $i_1^{th}$ first exchanger 123 and an inverted signal of the $i_1^{th}$ bank address subsignal; when a received selection signal sent by the random number generator 13 is a first signal, output the $i_1^{th}$ bank address subsignal as the $i_1^{th}$ bank address subsignal of the bank decoder 12 to the first decoder 122 and output the inverted signal of the $i_1^{th}$ bank address subsignal as the inverted signal of the $i_1^{th}$ bank address subsignal of the bank decoder 12 to the first decoder 122; when the received selection signal sent by the random number generator 13 is a second signal, output the inverted signal of the $i_1^{th}$ bank address subsignal as the $i_1^{th}$ bank address subsignal of the bank decoder 12 to the first decoder 122 and output the $i_1^{th}$ bank address subsignal as the inverted signal of bank address subsignal of the bank decoder 12 to the first decoder 122; and values of $i_1$ are 1, 2, . . . , and $m_1$.

The first decoder 122 is configured to generate a bank gating signal according to a bank address subsignal and its inverted signal output by each first exchanger 123.

Figure 3A:
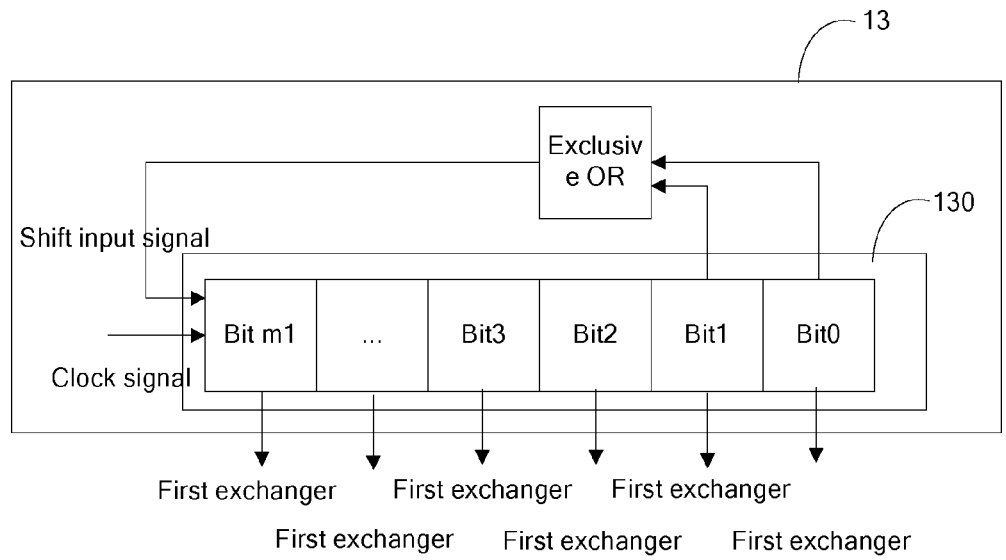
FIG. 3A is a structural diagram of an instance of a random number generator in a first embodiment of the nonvolatile memory according to the present invention.

With reference to FIG. 3A, the random number generator 13 shown in FIG. 3 may include: a linear feedback shift register 130 that has $m_1$ bits, where a signal obtained after exclusive OR processing is performed on the first bit bit0 and the second bit bit1 of the linear feedback shift register 130 is used as a shift input signal of the linear feedback shift register;

$m_1$ first exchangers 123 correspond to one bit of the linear feedback shift register separately and a corresponding bit is used as a selection signal sent by the random number generator. FIG. 3A does not show a specific correspondence between each first exchanger and a bit. The correspondence may be set in an actual application and is not limited herein.

A signal obtained after exclusive OR processing is performed on any other two bits of the linear feedback shift register 130 may also be used as a shift input signal of the linear feedback shift register 130.

The nonvolatile memory implementation structures shown in FIG. 3 and FIG. 3A are merely specific instances. According to the instances, a person of ordinary skill in the art can set a foregoing first exchanger for at least one bank address subsignal and its inverted signal in a bank address decoder to properly transform the instances to acquire various implementation structures of a nonvolatile memory that includes two or more banks. Details are not described herein again. Specifically, $2^{m_1}$ should be equal to or greater than an actual number of banks in the nonvolatile memory.

In addition, in different nonvolatile memory implementation structures, the number of bits included in the random number generator 13 shown in FIG. 3A can be adjusted according to the number of first exchangers included in the nonvolatile memory.

This embodiment is particularly applicable to a scenario where the nonvolatile memory stores data in one storage unit of each bank sequentially when storing data. For example, if data to be stored is A, B, and C, data A is stored in the first bank, data B is stored in the second bank, and data C is stored in the third bank.

In this embodiment, when a nonvolatile memory is powered on, a random number generator generates a selection signal to control each first exchanger in a bank decoder to keep a corresponding bank address subsignal and its inverted signal unchanged or exchange the corresponding bank address subsignal and the inverted signal of the bank address subsignal. Because the random number generator generates selection signals randomly, after the nonvolatile memory is powered off and then powered on, a same bank address subsignal corresponds to different bank gating signals compared with the nonvolatile memory before the power-off, which disarranges data, stored before the nonvolatile memory is powered off, when the nonvolatile memory is powered off and then powered on, so as to achieve an encrypting effect. As a result, the data stored in the nonvolatile memory cannot be sequentially read from original storage addresses, and other persons cannot obtain original data even if they use a software tool to directly read the data stored in the nonvolatile memory and it is difficult for them to recover the original data from the data stored in the nonvolatile memory, which ensures security of the data stored in the nonvolatile memory.

In a second embodiment of a nonvolatile memory according to the present invention, based on the first embodiment of the nonvolatile memory, at least one bank in the nonvolatile memory may further include the following structure: $n_2$ second exchangers disposed between a second signal generator and a second decoder of a row decoder and one second exchanger corresponds to one row address subsignal of the row decoder, where a random number generator may further be configured to: when the nonvolatile memory is powered on, randomly generate a selection signal for each second exchanger and send the generated selection signal to a corresponding second exchanger.

The $j_1^{th}$ second exchanger of each bank is configured to: receive the $j_2^{th}$ row address subsignal corresponding to the $j_1^{th}$ second exchanger and an inverted signal of the $j_2^{th}$ row address subsignal; when a received selection signal sent by the random number generator is a third signal, output the $j_2^{th}$ row address subsignal as the $j_2^{th}$ row address subsignal of the row decoder to the second decoder and output the inverted signal of the $j_2^{th}$ row address subsignal as the inverted signal of the $j_2^{th}$ row address subsignal of the row decoder to the second decoder; when the received selection signal sent by the random number generator is a fourth signal, output the inverted signal of the $j_2^{th}$ row address subsignal as the $j_2^{th}$ row address subsignal of the row decoder to the second decoder and output the $j_2^{th}$ row address subsignal as the inverted signal of the $j_2^{th}$ row address subsignal of the row decoder to the second decoder; and $1 \leq j_1 \leq n_2$, $1 \leq j_2 \leq m_2$, and $1 \leq n_2 \leq m_2$, where $m_2$ is a total number of row address subsignals of a row decoder to which the $j_1^{th}$ second exchanger belongs.

Values of $j_1$ and $j_2$ may be the same or different.

A total number of second exchangers $n_2$ may be smaller than a total number of input signals of a row decoder, that is, a total number of row address subsignals $m_2$. In this case, only $n_2$ row address subsignals and their inverted signals have corresponding second exchangers; the total number of second exchangers $n_2$ may also be equal to the total number of input signals of the row decoder, that is, the total number of row address subsignals $m_2$. In this case, each row address subsignal and its inverted signal have a corresponding second exchanger. The embodiment of the present invention achieves a better encrypting effect if a value of $n_2$ is closer to $m_2$.

The third signal in the embodiment of the present invention may be a high-level signal, and the fourth signal may correspondingly be a low-level signal; or the third signal may be a low-level signal, and the fourth signal may correspondingly be a high-level signal.

The random number generator may include: a linear feedback shift register that has at least $N_1$ bits, where a signal obtained after exclusive OR processing is performed on any two bits of the linear feedback shift register is used as a shift input signal of the linear feedback shift register; $N_1$ is a total number of first exchangers and second exchangers included in the nonvolatile memory.

Each first exchanger and each second exchanger correspond to one bit of the linear feedback shift register separately and a corresponding bit is used as a selection signal sent by the random number generator.

Figure 4:
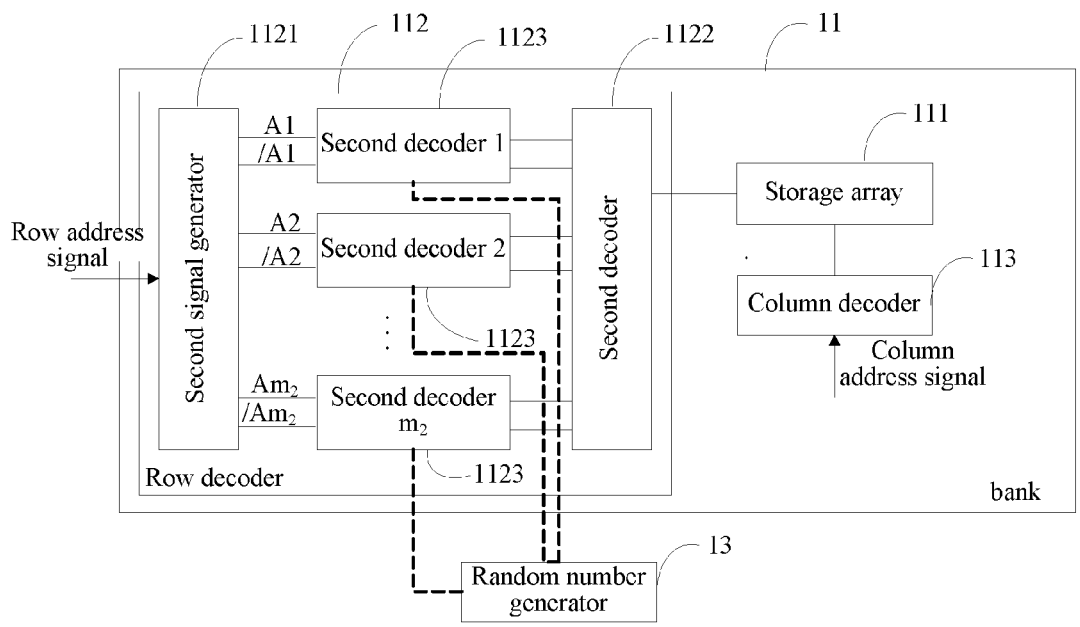
FIG. 4 is a structural diagram of an instance of a second embodiment of the nonvolatile memory according to the present invention.

The following describes a structure for implementing a nonvolatile memory in this embodiment with reference to FIG. 4. Because the implementation structure is too complex, FIG. 4 shows only: a structure for implementing a bank if the bank includes $n_2$ second exchangers 1123 disposed between a second signal generator 1121 and a second decoder 1122 of a row decoder, and a connection relationship between the bank and the random number generator 13 in FIG. 3, and does not show other structures and connection relationships in FIG. 3. In addition, in the bank structure diagram as shown in FIG. 4, $n_2=m_2$, and second exchangers correspond to row address subsignals of the row decoder sequentially, that is, $j_1=j_2$; the random number generator 13 may further be used to: when the nonvolatile memory is powered on, randomly generate a selection signal for each second exchanger 1123 and send the generated selection signal to a corresponding second exchanger 1123.

The row decoder 112 of the bank include the following structure:

the second signal generator 1121 outputs each row address subsignal and its inverted signal to a corresponding second exchanger 1123; specifically, the second signal generator 1121 sends the first row address subsignal A1 and its inverted signal /A1 to the first second exchanger, sends the second row address subsignal A2 and its inverted signal /A2 to the second second exchanger, . . . , and sends the $m_2^{th}$ row address subsignal $Am_t$ and its inverted signal /$Am_2$ to the $m_2^{th}$ second exchanger.

The $j_1^{th}$ second exchanger 1123 of each bank is configured to: receive the $j_1^{th}$ row address subsignal corresponding to the $j_1^{th}$ second exchanger 1123 and an inverted signal of the $j_1^{th}$ row address subsignal; when a received selection signal sent by the random number generator 13 is a third signal, output the $j_1^{th}$ row address subsignal as the $j_1^{th}$ row address subsignal of the row decoder 112 to the second decoder 1122 and output the inverted signal of the $j_1^{th}$ row address subsignal as the inverted signal of the $j_1^{th}$ row address subsignal of the row decoder 112 to the second decoder 1122; when the received selection signal sent by the random number generator 13 is a fourth signal, output the inverted signal of the $j_1^{th}$ row address subsignal as the $j_1^{th}$ row address subsignal of the row decoder 112 to the second decoder 1122 and output the $j_1^{th}$ row address subsignal as the inverted signal of the $j_1^{th}$ row address subsignal of the row decoder 112 to the second decoder 1122; and values of $j_1$ are 1, 2, . . . , and $m_2$.

The second decoder 1122 is configured to generate a row gating signal according to a row address subsignal and its inverted signal output by each second exchanger 1123.

Figure 4A:
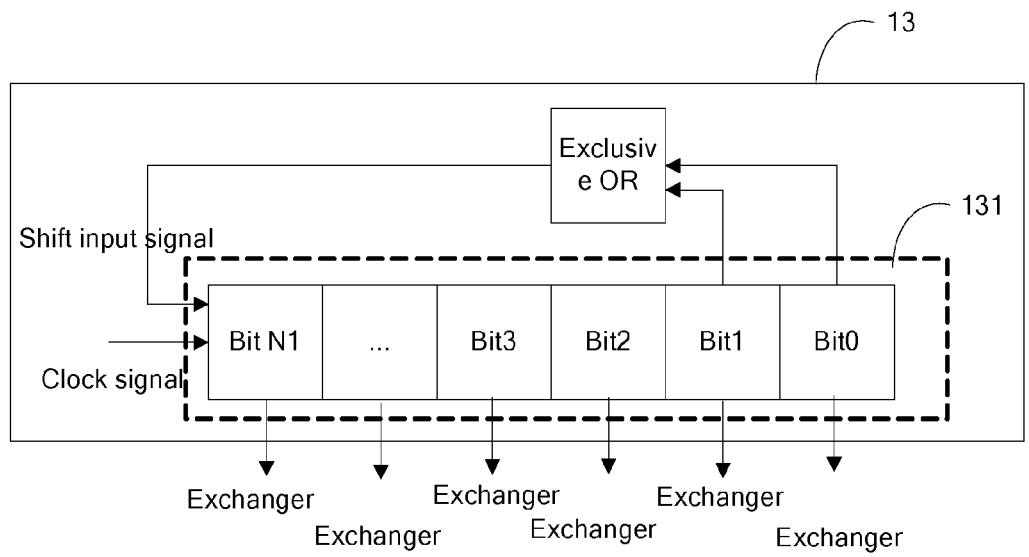
FIG. 4A is a structural diagram of an instance of a random number generator in a second embodiment of the nonvolatile memory according to the present invention.

When at least one bank in FIG. 3 is implemented by using the structure shown in FIG. 4, as shown in FIG. 4A, the random number generator 13 may include: a linear feedback shift register 131 that has $N_1$ bits, where a signal obtained after exclusive OR processing is performed on two bits bit0 and bit1 of the linear feedback shift register 131 is used as a shift input signal of the linear feedback shift register.

Each first exchanger 123 and each second exchanger 1123 correspond to one bit of the linear feedback shift register 131 separately and a corresponding bit is used as a selection signal sent by the random number generator 13.

Although FIG. 4A shows only an implementation manner for obtaining a shift input signal after exclusive OR processing is performed on two bits bit0 and bit1, a shift input signal can be acquired in an actual application after exclusive OR processing is performed on signals of any two bits of the linear feedback shift register 131, which is not limited herein.

If the second exchangers 1123 are disposed in a row decoder of only one bank in FIG. 3, $N_1 = n_1 + n_2$; if the second exchangers 1123 are disposed in row decoders of at least two banks in FIG. 3, $N_1$ is a sum of $n_1$ and the number of second exchangers in each row decoder.

FIG. 4A does not show correspondences between bits and first exchangers as well as second exchangers but use exchangers to indicate first exchangers and second exchangers. The correspondences between the bits and first exchangers as well as second exchangers can be set in the actual application and are not limited herein.

In the actual application, different banks may be provided with different numbers of second exchangers $n_2$ and use $j_1$, $j_2$, and the like of the same value or different values, which are not limited herein. A structure in which second exchangers are disposed in row decoders of other banks is similar to the bank structure in FIG. 4, with differences in that values of $n_2$ may be different, the values of $j_1$ and $j_2$ may be different, and some row address subsignals may not have corresponding second exchangers. Details are not described herein again The nonvolatile memory implementation structures shown in FIG. 4 and FIG. 4A are merely specific instances. According to the instances, a person of ordinary skill in the art can follow principles such as setting a foregoing first exchanger for at least one bank address subsignal and its inverted signal in a bank address decoder and setting a foregoing second exchanger for at least one row address subsignal and its inverted signal in a row decoder of at least one bank to properly transform the instances to acquire various implementation structures of a nonvolatile memory that includes two to an infinite number of banks in this embodiment. Details are not described herein again.

In this embodiment and compared with the embodiments shown in FIG. 3 and FIG. 3A, when a nonvolatile memory is powered on, a random number generator generates a selection signal to control, in addition to each first exchanger in a bank decoder, each second exchanger in a bank to keep a corresponding row address subsignal and an inverted signal of the row address subsignal unchanged or exchange the corresponding row address subsignal and the inverted signal of the row address subsignal. Because the random number generator generates selection signals randomly, after the nonvolatile memory is powered off and then powered on, a same bank address subsignal corresponds to different bank gating signals and a same row address subsignal corresponds to different row gating signals compared with the nonvolatile memory before the power-off, which disarranges data stored before the nonvolatile memory is powered off, when the nonvolatile memory is powered off and then powered on, so as to achieve an encrypting effect. As a result, the data stored in the nonvolatile memory cannot be read sequentially from original storage addresses, and other persons cannot obtain original data even if they use a software tool to directly read data stored in the nonvolatile memory and it is difficult for them to recover the original data from the data stored in the nonvolatile memory, which ensures security of the data stored in the nonvolatile memory.

In a third embodiment of a nonvolatile memory according to the present invention, based on the first embodiment of a nonvolatile memory, at least one bank in the nonvolatile memory may further include: $n_3$ third exchangers disposed between a third signal generator and a third decoder of a column decoder and one third exchanger corresponds to one column address subsignal of the column decoder, where a random number generator may further be configured to: when the nonvolatile memory is powered on, randomly generate a selection signal for each third exchanger and send the generated selection signal to a corresponding third exchanger;

The $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal sent by the random number generator is a fifth signal, output the $k_2^{th}$ column address subsignal as the $k_2^{th}$ column address subsignal of the column decoder to the third decoder and output the inverted signal of the $k_2^{th}$ column address subsignal as the inverted signal of the $k_2^{th}$ column address subsignal of the column decoder to the third decoder; when the received selection signal sent by the random number generator is a sixth signal, output the inverted signal of the $k_2^{th}$ column address subsignal as the $k_2^{th}$ column address subsignal of the column decoder to the third decoder and output the $k_2^{th}$ column address subsignal as the inverted signal of the $k_2^{th}$ column address subsignal of the column decoder to the third decoder; and $1 \leq k_1 \leq n_3$, $1 \leq k_2 \leq m_3$, and $1 \leq n_3 \leq m_3$, where $m_3$ is a total number of column address subsignals of a column decoder to which the $k_1^{th}$ third exchanger belongs.

Values of $k_1$ and $k_2$ may be the same or different.

A total number of third exchangers $n_3$ may be smaller than a total number of input signals of a column decoder, that is, a total number of column address subsignals $m_3$. In this case, only $n_3$ column address subsignals and their inverted signals have corresponding third exchangers; the total number of third exchangers $n_3$ may further be equal to the total number of input signals of the column decoder, that is, the total number of column address subsignals $m_3$. In this case, each column address subsignal and its inverted signal have a corresponding third exchanger. The embodiment of the present invention achieves a better encrypting effect if a value of $n_3$ is closer to $m_3$.

The fifth signal in the embodiment of the present invention may be a high-level signal, and the sixth signal may correspondingly be a low-level signal; or the fifth signal may be a low-level signal, and the sixth signal may correspondingly be a high-level signal.

The random number generator may include: a linear feedback shift register that has at least $N_2$ bits, where a signal obtained after exclusive OR processing is performed on any two bits of the linear feedback shift register is used as a shift input signal of the linear feedback shift register; $N_2$ is a total number of first exchangers and third exchangers included in the nonvolatile memory.

Each first exchanger and each exchanger correspond to one bit of the linear feedback shift register separately and a corresponding bit is used as a selection signal sent by the random number generator.

Figure 5:
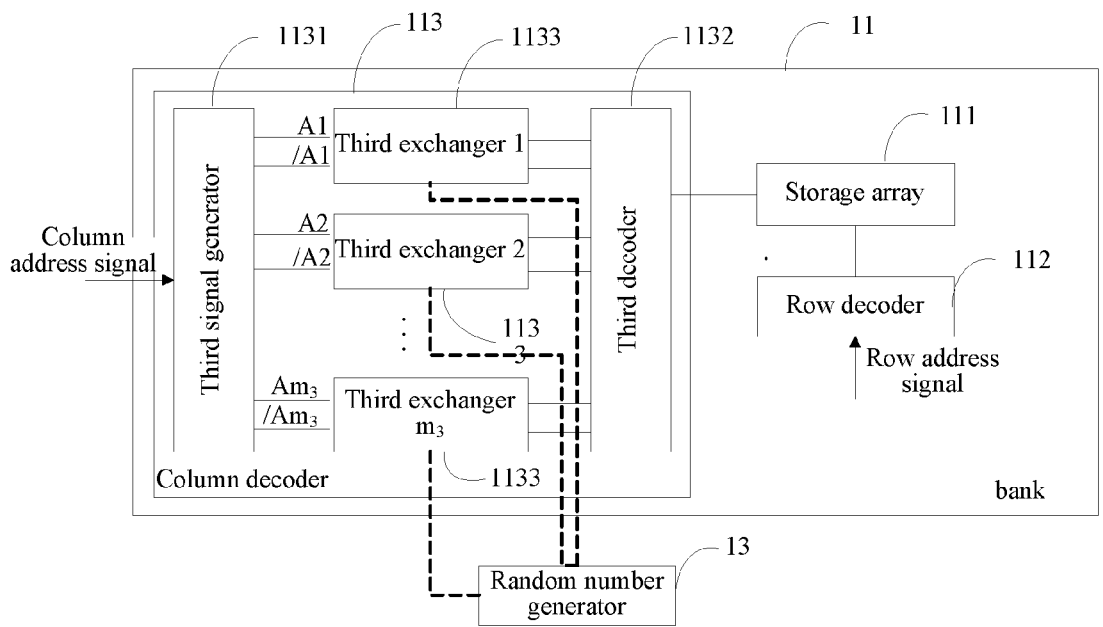
FIG. 5 is a structural diagram of an instance of a third embodiment of the nonvolatile memory according to the present invention.

The following describes a structure for implementing a nonvolatile memory in this embodiment with reference to FIG. 5. Because the implementation structure is too complex, FIG. 5 shows only: a structure for implementing a bank when the bank includes $n_3$ third exchangers 1133 disposed between a third signal generator 1131 and a third decoder 1132 of a column decoder 113, and a connection relationship between the bank and the random number generator 13 in FIG. 3, and does not show other structures and connection relationships in FIG. 3. In addition, in the bank structure diagram as shown in FIG. 5, $n_3=m_3$, and third exchangers correspond to column address subsignals of a column decoder sequentially, that is, $k_1=k_2$. The random number generator 13 may also be used to: when the nonvolatile memory is powered on, randomly generate a selection signal for each third exchanger 1133 and send the generated selection signal to a corresponding third exchanger 1133.

The third signal generator 1131 outputs each column address subsignal and its inverted signal to a corresponding third exchanger 123; specifically, the third signal generator 1131 sends the first column address subsignal A1 and its inverted signal /A1 to the first third exchanger, sends the second column address subsignal A2 and its inverted signal /A2 to the second third exchanger, . . . , and sends the $m_a{}^{th}$ column address subsignal $Am_1$ and its inverted signal $/Am_3$ to the $m_3{}^{th}$ third exchanger;

The $k_1{}^{th}$ third exchanger 1133 of each bank is configured to: receive the $k_1{}^{th}$ column address subsignal corresponding to the $k_1{}^{th}$ third exchanger 1133 and an inverted signal of the $k_1{}^{th}$ column address subsignal; when a received selection signal sent by the random number generator 13 is a fifth signal, output the $k_1{}^{th}$ column address subsignal as the $k_1{}^{th}$ column address subsignal of the column decoder 113 to the third decoder 1132 and output the inverted signal of the $k_1{}^{th}$ column address subsignal as the inverted signal of the $k_1{}^{th}$ column address subsignal $k_1$ of the column decoder 113 to the third decoder 1132; when the received selection signal sent by the random number generator 13 is a sixth signal, output the inverted signal of the $k_1{}^{th}$ column address subsignal $k_1$ as row address subsignal of the column decoder 113 to the third decoder 1132 and output the $k_1{}^{th}$ column address subsignal as the inverted signal of the $k_1{}^{th}$ column address subsignal of the column decoder 113 to the third decoder 1132; and values of $k_1$ are 1, 2, . . . , and $m_3$.

The third decoder 1132 is configured to generate a column gating signal according to a column address subsignal and its inverted signal output by each third exchanger 1133.

Figure 5A:
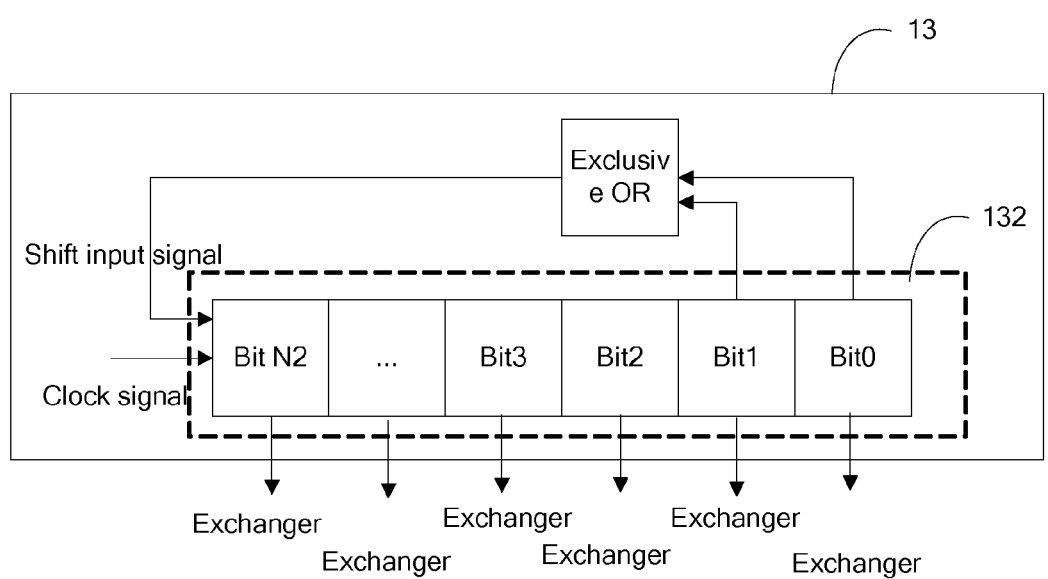
FIG. 5A is a structural diagram of an instance of a random number generator in a third embodiment of the nonvolatile memory according to the present invention.

When at least one bank in FIG. 3 is implemented by using the structure shown in FIG. 5, the random number generator 13, as shown in FIG. 5A, may include: a linear feedback shift register 132 that has $N_2$ bits, where a signal obtained after exclusive OR processing is performed on two bits bit0 and bit1 of the linear feedback shift register 132 is used as a shift input signal of the linear feedback shift register.

Each first exchanger and each exchanger correspond to one bit of the linear feedback shift register separately and a corresponding bit is used as a selection signal sent by the random number generator 13.

Although FIG. 5A shows only an implementation manner for obtaining a shift input signal after exclusive OR processing is performed on two bits bit0 and bit1, a shift input signal can be obtained in an actual application after exclusive OR processing is performed on signals of any two bits of the linear feedback shift register 132, which is not limited herein.

If third exchangers 1133 are disposed in a column decoder of only one bank in FIG. 3, $N_1=n_1+n_3$; if third exchangers 1133 are disposed in column decoders of at least two banks in FIG. 3, $N_1$ is a sum of $n_1$ and the number of third exchangers in each column decoder.

Although FIG. 5A shows only an implementation manner for obtaining a shift input signal after exclusive OR processing is performed on two bits bit0 and bit1, the shift input signal can be obtained in the actual application after exclusive OR processing is performed on signals of any two bits of the linear feedback shift register 132, which is not limited herein.

FIG. 5A does not show correspondences between bits and first exchangers as well as third exchangers but use exchangers to indicate first exchangers and third exchangers. Correspondences between the bits and first exchangers as well as third exchangers can be set in the actual application and are not limited herein.

In the actual application, different banks may be provided with different numbers of third exchangers $n_3$ and use $k_1$ and $k_2$ of the same value or different values, which are not limited herein. A structure in which third exchangers are disposed in column decoders of other banks is similar to the bank structure in FIG. 5, with differences in that the values of $n_3$ may be different, the values of $k_1$ and $k_2$ may be different, and some column address subsignals may not have corresponding third exchangers. Details are not described herein again.

The nonvolatile memory implementation structures shown in FIG. 5 and FIG. 5A are merely specific instances. According to the instances, a person of ordinary skill in the art can follow principles such as setting a foregoing first exchanger for at least one bank address subsignal and its inverted signal in a bank address decoder and setting a foregoing third exchanger for at least one column address subsignal and its inverted signal in a column decoder of at least one bank to properly transform the instances to acquire various implementation structures of a nonvolatile memory that includes two or more banks in this embodiment. Details are not described herein again.

In this embodiment and compared with the embodiments shown in FIG. 3 and FIG. 3A, when a nonvolatile memory is powered on, a random number generator generates a selection signal to control, in addition to each first exchanger in a bank decoder, each third exchanger in a bank to keep a corresponding column address subsignal and an inverted signal of the column address subsignal unchanged or exchange the corresponding column address subsignal and the inverted signal of the column address subsignal. Because the random number generator generates selection signals randomly, after the nonvolatile memory is powered off and then powered on, a same bank address subsignal corresponds to different bank gating signals and a same column address subsignal corresponds to different column gating signals compared with the nonvolatile memory before the power-off, which disarranges data stored before the nonvolatile memory is powered off when the nonvolatile memory is powered off and then powered on, so as to achieve an encrypting effect. As a result, the data stored in the nonvolatile memory cannot be read sequentially from original storage addresses, and other persons cannot obtain original data even if they use a software tool to directly read the data stored in the nonvolatile memory and it is difficult for them to recover the original data from the data stored in the nonvolatile memory, which ensures security of the data stored in the nonvolatile memory.

In a fourth embodiment of a nonvolatile memory according to the present invention, based on a second embodiment of a nonvolatile memory, at least one bank in the nonvolatile memory may further include: $n_3$ third exchangers disposed between a third signal generator and a third decoder of the column decoder, and one third exchanger corresponds to one column address subsignal of the column decoder, where:

The random number generator is further configured to: when the nonvolatile memory is powered on, randomly generate a selection signal for each third exchanger and send the generated selection signal to a corresponding third exchanger.

The $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal sent by the random number generator is a fifth signal, output the $k_2^{th}$ column address subsignal as the $k_2^{th}$ column address subsignal of the column decoder to the third decoder and output the inverted signal of the $k_2^{th}$ column address subsignal as the inverted signal of the $k_2^{th}$ column address subsignal of the column decoder to the third decoder; when the received selection signal sent by the random number generator is a sixth signal, output the inverted signal of the $k_2^{th}$ column address subsignal as the $k_2^{th}$ column address subsignal of the column decoder to the third decoder and output the $k_2^{th}$ column address subsignal as the inverted signal of the $k_2^{th}$ column address subsignal of the column decoder to the third decoder; and $1 \le k_1 \le n_3$, $1 \le k_2 \le m_3$, and $1 \le n_3 \le m_3$, where $m_3$ is a total number of column address subsignals of a column decoder to which the $k_1^{th}$ third exchanger belongs.

Values of $j_1$ and $j_2$ may be the same or different.

A total number of second exchangers $n_2$ may be smaller than a total number of input signals of a row decoder, that is, a total number of row address subsignals $m_2$. In this case, only $n_2$ row address subsignals and their inverted signals have corresponding second exchangers; the total number of second exchangers $n_2$ may also be equal to the total number of input signals of the row decoder, that is, the total number of row address subsignals $m_2$. In this case, each row address subsignal and its inverted signal have a corresponding second exchanger. The embodiment of the present invention achieves a better encrypting effect if a value of $n_2$ is closer to $m_2$.

The first signal in the embodiment of the present invention may be a high-level signal, and the second signal may correspondingly be a low-level signal; or the first signal may be a low-level signal, and the second signal may correspondingly be a high-level signal.

The random number generator may include: a linear feedback shift register that has at least $N_3$ bits, where a signal obtained after exclusive OR processing is performed on any two bits of the linear feedback shift register is used as a shift input signal of the linear feedback shift register; $N_3$ is a total number of first exchangers, second exchangers, and third exchangers included in the nonvolatile memory.

Each first exchanger, each second exchanger, and each third exchanger correspond to one bit of the linear feedback shift register separately and a corresponding bit is used as a selection signal sent by the random number generator.

In this embodiment, each bank in the nonvolatile memory has four possible implementation structures: first, no second exchanger is disposed in a row decoder and no third exchanger is disposed in a column decoder of a bank; second, second exchangers are disposed in a row decoder and no third exchanger is disposed in a column decoder of a bank; third, no second exchanger is disposed in a row decoder and third exchangers are disposed in a column decoder of a bank; and four, second exchangers are disposed in a row decoder and third exchangers are disposed in a column decoder of a bank. However, second exchangers are disposed in a row decoder of at least one bank and third exchangers are disposed in a column decoder of at least one bank in the nonvolatile memory.

For example, a nonvolatile memory includes four banks, bank 1 is implemented by using the second possible implementation structure, bank 2 is implemented by using the fourth possible implementation structure, bank 3 is implemented by using the third possible implementation structure, and bank 4 is implemented by using the first possible implementation structure.

The first possible implementation structure of a bank is the same as the implementation structure of a bank in the prior art and details are not described herein again. For the second possible implementation structure of a bank, refer to the bank implementation structure example shown in FIG. 4 and details are not described herein again. For the third possible implementation structure of a bank, refer to the bank implementation structure example shown in FIG. 5 and details are not described herein again.

Figure 6:
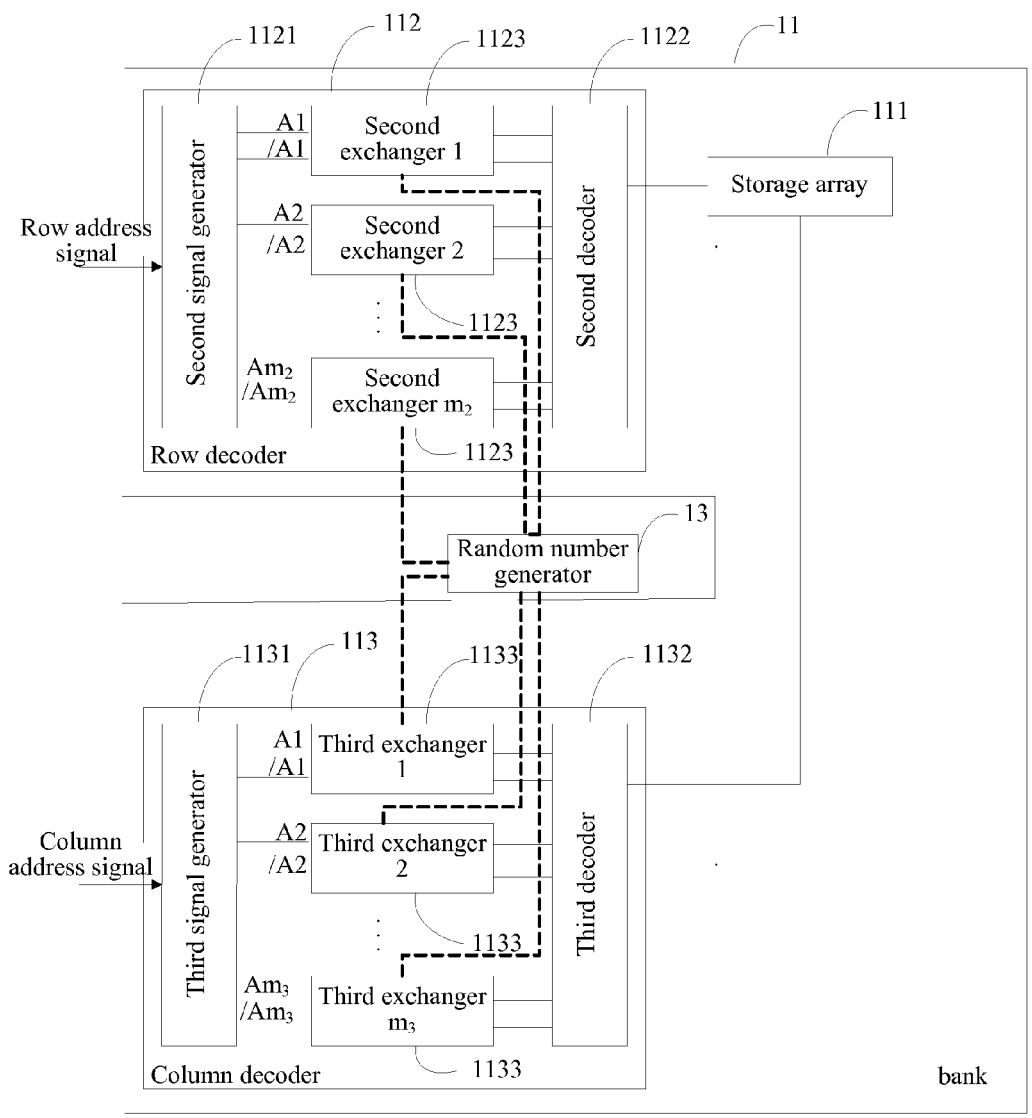
FIG. 6 is a structural diagram of an instance of a fourth embodiment of the nonvolatile memory according to the present invention.

The following describes the fourth possible implementation structure of a bank and its connection relationship with a random number generator with reference to FIG. 6. In addition, it is set in the bank structure diagram shown in FIG. 6 that: $n_2=m_2$, second exchangers sequentially correspond to row address subsignals of a row decoder, that is, $j_1=j_2$ and $n_3=m_3$, and third exchangers sequentially correspond to column address subsignals of a column decoder, that is, $k_1=k_2$, where:

the random number generator 13 is configured to: when the nonvolatile memory is powered on, randomly generate a selection signal for each second exchanger and third exchanger, and send the generated selection signal to a corresponding second exchanger and a corresponding third exchanger;

For description of the second signal generator 1121, second exchanger 1123, and second decoder 1122 of the row decoder, refer to the relevant description of a second signal generator, second exchanger, and second decoder in an instance shown in FIG. 4; for description of the third signal generator 1131, third exchanger 1133, and third decoder 1132 of the column decoder, refer to the relevant description of a third signal generator, third exchanger, and third decoder in an instance shown in FIG. 5; details are not described herein again.

Figure 6A:
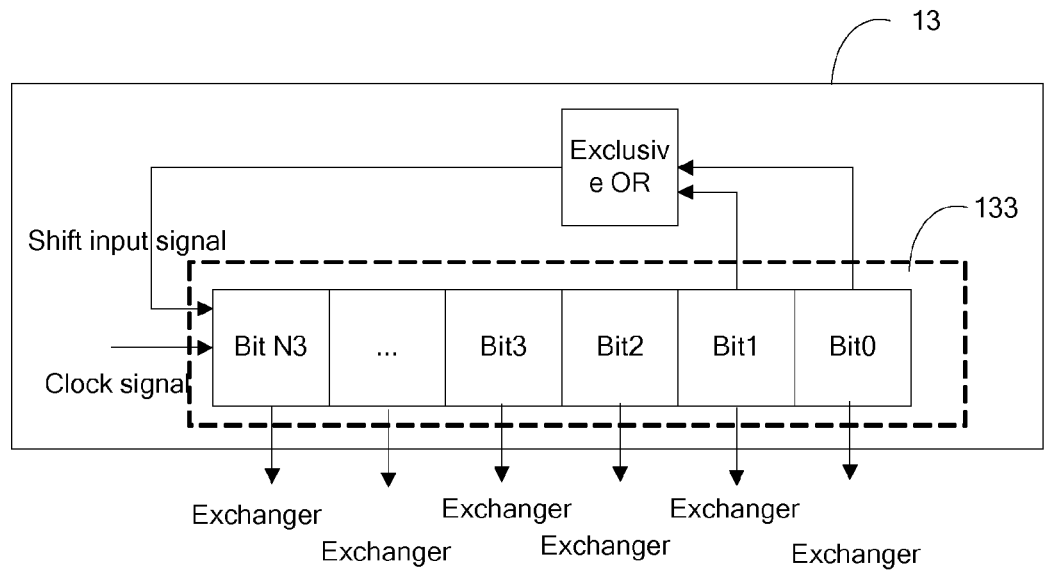
FIG. 6A is a structural diagram of an instance of a random number generator in a fourth embodiment of the nonvolatile memory according to the present invention.

As shown in FIG. 6A, the random number generator 13 in this embodiment may include: a linear feedback shift register 133 that has $N_3$ bits, where a signal obtained after exclusive OR processing is performed on two bits bit0 and bit1 of the linear feedback shift register 133 is used as a shift input signal of the linear feedback shift register;

each first exchanger, each second exchanger, and each third exchanger correspond to one bit of the linear feedback shift register 133 separately and a corresponding bit is used as a selection signal sent by the random number generator 13.

$N_3$ is a total number of first exchangers, second exchangers, and third exchangers in the nonvolatile memory.

Although FIG. 6A shows only an implementation manner for obtaining a shift input signal after exclusive OR processing is performed on two bits bit0 and bit1, the shift input signal can be obtained in an actual application after exclusive OR processing is performed on signals of any two bits of the linear feedback shift register 133, which is not limited herein.

FIG. 6A does not show correspondences between bits and first exchangers, second exchangers, as well as third exchangers, but use exchangers to indicate first exchangers, second exchangers, and third exchangers. The correspondences between the bits and the first exchangers, the second exchangers, as well as the third exchangers can be set in the actual application and are not limited herein.

In the actual application, different banks may be provided with different numbers of second exchangers $n_2$ and use $j_1$ and $j_2$ of the same value or different values, and different banks may be provided with different numbers of third exchangers $n_3$, and use $k_1$ and $k_2$ of the same value or different values, which are not limited herein. A structure in which second exchangers are disposed in row decoders and third exchangers are disposed in column decoders of other banks is similar to the bank structure in FIG. 5, with differences in that values of $n_2$, $n_3$, $j_1$, $j_2$, $k_1$, and $k_2$ may be different, some row address subsignals may not have corresponding second exchangers, and some column address subsignals may not have corresponding third exchangers.

The nonvolatile memory implementation structures shown in FIG. 6 and FIG. 6A are merely specific instances. According to the instances, a person of ordinary skill in the art can follow principles such as setting a foregoing first exchanger for at least one bank address subsignal and its inverted signal in a bank address decoder, setting a foregoing second exchanger for at least one row address subsignal and its inverted signal in a row decoder of at least one bank, and setting a foregoing third exchanger for at least one column address subsignal and its inverted signal in a column decoder of at least one bank to properly transform the instances to acquire various implementation structures of a nonvolatile memory that includes two to an infinite number of banks in this embodiment. Details are not described herein again.

In this embodiment and compared with the second embodiment, when a nonvolatile memory is powered on, a random number generator generates a selection signal to control, in addition to first exchangers and second exchangers, each third exchanger in a bank to keep a corresponding column address subsignal and an inverted signal of the column address subsignal unchanged or exchange the corresponding column address subsignal and the inverted signal of the column address subsignal, so that a column gating signal actually output by a column decoder is the same as or different from a column gating signal corresponding to a column address subsignal before. Because the random number generator generates selection signals randomly, after the nonvolatile memory is powered off and then powered on, compared with the nonvolatile memory before the power-off, a same bank address subsignal corresponds to different bank gating signals, a same row address subsignal corresponds to different row gating signals, and a same column address subsignal corresponds to different column gating signals, which disarranges data, stored before the nonvolatile memory is powered off, when the nonvolatile memory is powered off and then powered on, so as to achieve an encrypting effect. As a result, the data stored in the nonvolatile memory cannot be sequentially read from original storage addresses, and other persons cannot obtain original data even if they use a software tool to directly read the data stored in the nonvolatile memory and it is difficult for them to recover the original data from the data stored in the nonvolatile memory, which ensures security of the data stored in the nonvolatile memory.

In a fifth embodiment of a nonvolatile memory according to the present invention, the nonvolatile memory includes at least one bank, and each bank includes a storage array, a row decoder of the storage array, and a column decoder of the storage array. The nonvolatile memory also includes a random number generator, the at least one bank further includes $n_2$ second exchangers disposed between a second signal generator and a second decoder of the row decoder, and one second exchanger corresponds to one row address subsignal of the row decoder, where, the random number generator is configured to: when the nonvolatile memory is powered on, randomly generate a selection signal for each second exchanger and send the generated selection signal to a corresponding second exchanger.

The $j_1{}^{th}$ second exchanger of each bank is configured to: receive the $j_2{}^{th}$ row address subsignal corresponding to the $j_1{}^{th}$ second exchanger and an inverted signal of the $j_2{}^{th}$ row address subsignal; when a received selection signal sent by the random number generator is a third signal, output the $j_2{}^{th}$ row address subsignal as the $j_2{}^{th}$ row address subsignal of the row decoder to the second decoder and output the inverted signal of the $j_2{}^{th}$ row address subsignal as the inverted signal of the $j_2{}^{th}$ row address subsignal of the row decoder to the second decoder; when the received selection signal sent by the random number generator is a fourth signal, output the inverted signal of the $j_2{}^{th}$ row address subsignal as the $j_2{}^{th}$ row address subsignal of the row decoder to the second decoder and output the $j_2{}^{th}$ row address subsignal as the inverted signal of row address subsignal of the row decoder to the second decoder; and $1 \leq j_1 \leq n_2$, $1 \leq j_2 \leq m_2$, and $1 \leq n_2 \leq m_2$, where $m_2$ is a total number of row address subsignals of a row decoder to which the $j_1{}^{th}$ second exchanger belongs.

Values of $j_1$ and $j_2$ may be the same or different.

A total number of second exchangers $n_2$ may be smaller than a total number of input signals of a row decoder, that is, a total number of row address subsignals $m_2$. In this case, only $n_2$ row address subsignals and their inverted signals have corresponding second exchangers; the total number of second exchangers $n_2$ may also be equal to the total number of input signals of the row decoder, that is, the total number of row address subsignals $m_2$. In this case, each row address subsignal and its inverted signal have a corresponding second exchanger. The embodiment of the present invention achieves a better encrypting effect if a value of is $n_2$ closer to $m_2$.

The first signal in the embodiment of the present invention may be a high-level signal, and the second signal may correspondingly be a low-level signal; or the first signal may be a low-level signal, and the second signal may correspondingly be a high-level signal.

The random number generator may include: a linear feedback shift register that has at least $N_4$ bits, where a signal obtained after exclusive OR processing is performed on any two bits of the linear feedback shift register is used as a shift input signal of the linear feedback shift register; $N_4$ is a total number of second exchangers included in the nonvolatile memory.

Each second exchanger corresponds to one bit of the linear feedback shift register and a corresponding bit is used as a selection signal sent by the random number generator.

Figure 7:
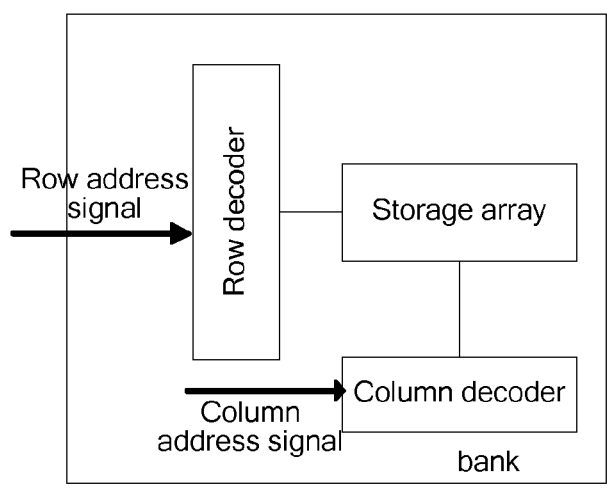
FIG. 7 is a structural diagram of a fifth embodiment of the nonvolatile memory according to the present invention.
Figure 7A:
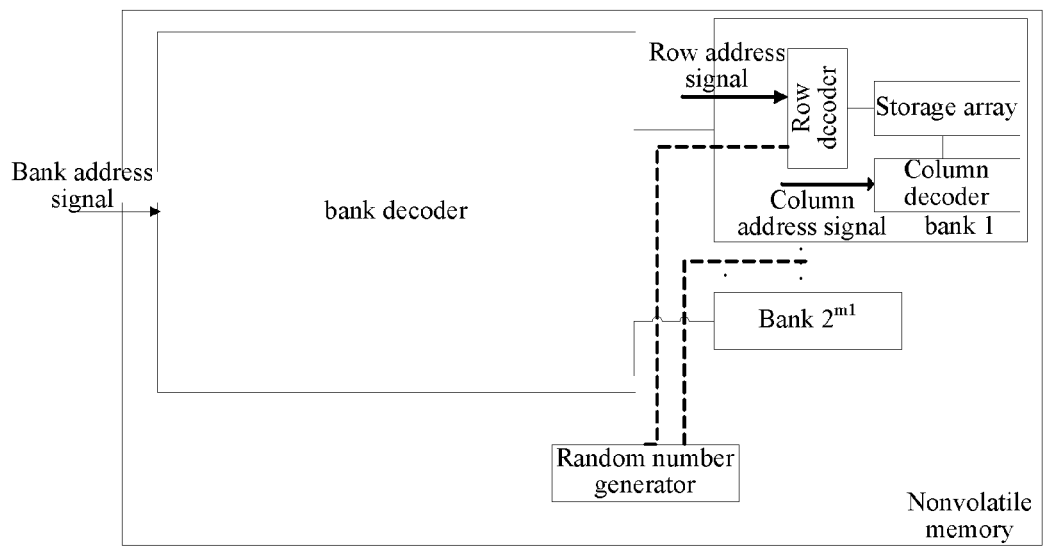
FIG. 7A is another structural diagram of a fifth embodiment of the nonvolatile memory according to the present invention.

In this embodiment, a nonvolatile may include only one bank, as shown in FIG. 7. However, FIG. 7 does not show a specific implementation structure in which second exchangers are disposed in a row decoder. In this case, no bank decoder may be disposed in the nonvolatile memory. The nonvolatile memory may further include two or more than two banks. In this case, a bank decoder is generally disposed in the nonvolatile memory, as shown in FIG. 7A. However, FIG. 7A does not show a specific implementation structure in which second exchangers are disposed in the row decoder. When a bank decoder is disposed in the nonvolatile memory, no first exchanger may be disposed or first exchangers may be disposed in the bank decoder. When first exchangers are disposed in a bank decoder, implementation of the bank decoder is similar to that in the nonvolatile memory provided in the second embodiment. Therefore, this embodiment only describes a situation in which the nonvolatile memory does not include the bank decoder or no first exchanger is disposed in the bank decoder, and the nonvolatile memory is implemented by using a structure in the prior art.

In this embodiment, a bank of a nonvolatile memory has two possible implementation structures: first, no second exchanger is disposed in a row decoder; and second, second exchangers are disposed in a row decoder. However, at least one bank in the nonvolatile memory is implemented by using the second possible implementation structure.

The first possible implementation structure of a bank is the same as the implementation structure of a bank in the prior art and is not repeatedly described herein.

For the second possible implementation structure of a bank, refer to the bank implementation structure example shown in FIG. 4 and its description.

For implementation of a random number generator in this embodiment, refer to the random number generator instance shown in FIG. 3A. The only differences are that the number of bits of the random number generator in this embodiment can be $N_4$ and each bit connects to a second exchanger.

In an actual application, different banks may be provided with different numbers of second exchangers $n_2$ and use $j_1$ and $j_2$ of the same value or different values, which are not limited herein. A structure in which second exchangers are disposed in row decoders of other banks is similar to the bank structure in FIG. 4, with differences in that values of $n_2$ may be different, the values of $j_1$ and $j_2$ may be different, and some row address subsignals may not have corresponding second exchangers. Details are not described herein again.

According to the foregoing instances, a person of ordinary skill in the art can follow principles such as setting a foregoing second exchanger for at least one row address subsignal and its inverted signal in a row decoder of at least one bank to properly transform the instances to acquire various implementation structures of a nonvolatile memory that includes any number of banks in this embodiment. Details are not described herein again.

In this embodiment, when a nonvolatile memory is powered on, a random number generator generates a selection signal to control each second exchanger to keep a corresponding row address subsignal and an inverted signal of the row address subsignal unchanged or exchange the corresponding row address subsignal and the inverted signal of the row address subsignal. Because the random number generator generates selection signals randomly, after the nonvolatile memory is powered off and then powered on, a same row address subsignal corresponds to different row gating signals compared with the nonvolatile memory before the power-off, which disarranges data, stored before the nonvolatile memory is powered off, when the nonvolatile memory is powered off and then powered on, so as to achieve an encrypting effect. As a result, the data stored in the nonvolatile memory cannot be sequentially read from original storage addresses, and other persons cannot obtain original data even if they use a software tool to directly read the data stored in the nonvolatile memory and it is difficult for them to recover the original data from the data stored in the nonvolatile memory, which ensures security of the data stored in the nonvolatile memory.

In a sixth embodiment of a nonvolatile memory according to the present invention, based on the fifth embodiment of a nonvolatile memory, at least one bank in the nonvolatile memory may further include: $n_3$ third exchangers disposed between a third signal generator and a third decoder of a column decoder and one third exchanger corresponds to one column address subsignal of the column decoder, where a random number generator is further configured to: when the nonvolatile memory is powered on, randomly generate a selection signal for each third exchanger and send the generated selection signal to a corresponding third exchanger.

The $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal sent by the random number generator is a fifth signal, output the $k_2^{th}$ column address subsignal as the $k_2^{th}$ column address subsignal of the column decoder to the third decoder and output the inverted signal of the $k_2^{th}$ column address subsignal as the inverted signal of the $k_2^{th}$ column address subsignal of the column decoder to the third decoder; when the received selection signal sent by the random number generator is a sixth signal, output the inverted signal of the $k_2^{th}$ column address subsignal as the $k_2^{th}$ column address subsignal of the column decoder to the third decoder and output the $k_2^{th}$ column address subsignal as the inverted signal of the $k_2^{th}$ column address subsignal of the column decoder to the third decoder; and $1 \leq k_1 \leq n_3$, $1 \leq k_2 \leq m_3$, and $1 \leq n_3 \leq m_3$, where $m_3$ is a total number of column address subsignals of a column decoder to which the $k_1^{th}$ third exchanger belongs.

Values of $k_1$ and $k_2$ may be the same or different.

A total number of third exchangers $n_3$ may be smaller than a total number of input signals of a column decoder, that is, a total number of column address subsignals $m_3$. In this case, only $n_3$ column address subsignals and their inverted signals have corresponding third exchangers; the total number of third exchangers $n_3$ may also be equal to the total number of input signals of the column decoder, that is, the total number of column address subsignals $m_3$. In this case, each column address subsignal and its inverted signal have a corresponding third exchanger. The embodiment of the present invention achieves a better encrypting effect if a value of $n_3$ is closer to $m_3$.

The fifth signal in this embodiment of the present invention may be a high-level signal, and the sixth signal may correspondingly be a low-level signal; or the fifth signal may be a low-level signal, and the sixth signal may correspondingly be a high-level signal.

The random number generator may include: a linear feedback shift register that has at least $N_5$ bits, where a signal obtained after exclusive OR processing is performed on any two bits of the linear feedback shift register is used as a shift input signal of the linear feedback shift register; $N_5$ is a total number of second exchangers and third exchangers included in the nonvolatile memory; each second exchanger and each third exchanger correspond to one bit of the linear feedback shift register separately and a corresponding bit is used as a selection signal sent by the random number generator.

In this embodiment, when a nonvolatile memory includes only one bank, no bank decoder may be disposed, and when a nonvolatile memory includes two or more than two banks, bank decoders may be disposed, which are not limited herein. When a bank decoder is disposed in the nonvolatile memory, no first exchanger may be disposed in the bank decoder; or the first exchanger can be disposed. When first exchangers are disposed in a bank decoder, implementation of the bank decoder is similar to that in the nonvolatile memory provided in the second embodiment. Therefore, this embodiment only describes a situation in which the nonvolatile memory does not include the bank decoder or no first exchanger is disposed in the bank decoder, and the nonvolatile memory is implemented by using a structure in the prior art.

In this embodiment, each bank included in the nonvolatile memory has four possible implementation structures: first, no second exchanger is disposed in a row decoder and no third exchanger is disposed in a column decoder of a bank; second, second exchangers are disposed in a row decoder and no third exchanger is disposed in a column decoder of a bank; third, no second exchanger is disposed in a row decoder and third exchangers are disposed in a column decoder of a bank; and four, second exchangers are disposed in a row decoder and third exchangers are disposed in a column decoder of a bank. However, second exchangers are disposed in a row decoder of at least one bank and third exchangers are disposed in a column decoder of at least one bank in the nonvolatile memory.

For example, a nonvolatile memory includes four banks, bank 1 is implemented by using the second possible implementation structure, bank 2 is implemented by using the fourth possible implementation structure, bank 3 is implemented by using the third possible implementation structure, and bank 4 is implemented by using the first possible implementation structure.

The first possible implementation structure of a bank is the same as the implementation structure of a bank in the prior art and is not repeatedly described herein. For the second possible implementation structure of a bank, refer to the bank implementation structure example shown in FIG. 4 and details are not described herein again. For the third possible implementation structure of a bank, refer to the bank implementation structure example shown in FIG. 5 and details are not described herein again.

For the fourth possible implementation structure of a bank, refer to the bank implementation structure example shown in FIG. 6 and its description.

For implementation of the random number generator in this embodiment, refer to the random number generator instance shown in FIG. 3A. The only differences are that the number of bits of the random number generator in this embodiment can be $N_5$ and each bit connects to a second exchanger or third exchanger.

In an actual application, different banks may be provided with different numbers of second exchangers $n_2$, and use $j_1$ and $j_2$ of the same value or different values; different banks may be provided with different numbers of third exchangers $n_3$, and use $k_1$ and $k_2$ of the same value or different values, which are not limited herein. A structure in which second exchangers are disposed in row decoders and third exchangers are disposed in column decoders of other banks is similar to the bank structure in FIG. 6, with differences in that values of $n_2$, $n_3$, $j_1$, $j_2$, $k_1$, and $k_2$ may be different, row address subsignals in some row decoders may not have corresponding second exchangers, and column address subsignals in some column decoders may not have corresponding third exchangers.

According to this embodiment and its instances, a person of ordinary skill in the art can follow principles such as setting a foregoing second exchanger for at least one row address subsignal and its inverted signal in a row address decoder of at least one bank and setting a foregoing third exchanger for at least one column address subsignal and its inverted signal in a column decoder of at least one bank to properly transform the instances to acquire various implementation structures of a nonvolatile memory that includes any number of banks in this embodiment. Details are not described herein again.

In this embodiment and compared with the fifth embodiment, when a nonvolatile memory is powered on, a random number generator generates a selection signal to control, in addition to second exchangers, each third exchanger to keep a corresponding column address subsignal and an inverted signal of the column address subsignal unchanged or exchange the corresponding column address subsignal and the inverted signal of the column address subsignal. Because the random number generator generates selection signals randomly, after the nonvolatile memory is powered off and then powered on, compared with the nonvolatile memory before the power-off, a same row address subsignal corresponds to different row gating signals and a same column address subsignal corresponds to different column gating signals, which disarranges data, stored before the nonvolatile memory is powered off, when the nonvolatile memory is powered off and then powered on, so as to achieve an encrypting effect. As a result, data stored in the nonvolatile memory cannot be sequentially read from original storage addresses, and other persons cannot obtain original data even if they use a software tool to directly read the data stored in the nonvolatile memory and it is difficult for them to recover the original data from the data stored in the nonvolatile memory, which ensures security of the data stored in the nonvolatile memory.

In a seventh embodiment of a nonvolatile memory according to the present invention, the nonvolatile memory includes at least one bank, and each bank includes a storage array, a row decoder of the storage array, and a column decoder of the storage array. The nonvolatile memory further includes a random number generator. The at least one bank further includes $n_3$ third exchangers disposed between a third signal generator and a third decoder of a column decoder and one third exchanger corresponds to one column address subsignal of the column decoder, where the random number generator is configured to: when the nonvolatile memory is powered on, randomly generate a selection signal for each third exchanger and send the generated selection signal to a corresponding third exchanger.

The $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal sent by the random number generator is a fifth signal, output the $k_2^{th}$ column address subsignal as the $k_2^{th}$ column address subsignal of the column decoder to the third decoder and output the inverted signal of the $k_2^{th}$ column address subsignal as the inverted signal of the $k_2^{th}$ column address subsignal of the column decoder to the third decoder; when the received selection signal sent by the random number generator is a sixth signal, output the inverted signal of the $k_2^{th}$ column address subsignal as the $k_2^{th}$ column address subsignal of the column decoder to the third decoder and output the $k_2^{th}$ column address subsignal as the inverted signal of the $k_2^{th}$ column address subsignal of the column decoder to the third decoder; and $1 \leq k_1 \leq n_3$, $1 \leq k_2 \leq m_3$, and $1 \leq n_3 \leq m_3$, where $m_3$ is a total number of column address subsignals of a column decoder to which the $k_1^{th}$ third exchanger belongs.

Values of $k_1$ and $k_2$ may be the same or different.

A total number of third exchangers $n_3$ may be smaller than a total number of input signals of a column decoder, that is, a total number of column address subsignals $m_3$. In this case, only $n_3$ column address subsignals and their inverted signals have corresponding third exchangers; the total number of third exchangers $n_3$ may further be equal to the total number of input signals of the column decoder, that is, the total number of column address subsignals $m_3$. In this case, each column address subsignal and its inverted signal have a corresponding third exchanger. The embodiment of the present invention achieves a better encrypting effect if a value of $n_3$ is closer to $m_3$.

The fifth signal in the embodiment of the present invention may be a high-level signal, and the sixth signal may correspondingly be a low-level signal; or the fifth signal may be a low-level signal, and the sixth signal may correspondingly be a high-level signal.

The random number generator may include a linear feedback shift register that has at least $N_6$ bits, where a signal obtained after exclusive OR processing is performed on any two bits of the linear feedback shift register is used as a shift input signal of the linear feedback shift register; $N_6$ is a total number of third exchangers included in the nonvolatile memory.

Each exchanger corresponds to one bit of the linear feedback shift register separately and a corresponding bit is used as a selection signal sent by the random number generator.

In this embodiment, when a nonvolatile memory includes only one bank, no bank decoder may be disposed, and when a nonvolatile memory includes two or more banks, bank decoders may be disposed, which are not limited herein. When a bank decoder is disposed in the nonvolatile memory, no first exchanger may be disposed in the bank decoder; or the first exchanger can be disposed. When first exchangers are disposed in a bank decoder, implementation of the bank decoder is similar to that in the nonvolatile memory provided in the second embodiment. Therefore, this embodiment only describes a situation in which the nonvolatile memory does not include a bank decoder or no first exchanger disposed in the bank decoder, and the nonvolatile memory is implemented by using a structure in the prior art.

In this embodiment, a bank of a nonvolatile memory has two possible implementation structures: first, no third exchanger is disposed in a column decoder; and second, third exchangers are disposed in a column decoder. However, at least one bank in the nonvolatile memory is implemented by using the second possible implementation structure.

The first possible implementation structure of a bank is the same as the implementation structure of a bank in the prior art and is not repeatedly described herein.

For the second possible implementation structure of a bank, refer to the bank implementation structure example shown in FIG. 5 and its description.

For implementation of a random number generator in this embodiment, refer to the random number generator instance shown in FIG. 3A. The only differences are that the number of bits of the random number generator in this embodiment can be $N_6$ and each bit connects to a third exchanger.

In an actual application, different banks may be provided with different numbers of third exchangers $n_3$ and use $k_1$ and $k_2$ of the same value or different values, which are not limited herein. A structure in which third exchangers are disposed in column decoders of other banks is similar to the bank structure in FIG. 5, with differences in that values of $n_2$ may be different, values of $j_1$ and $j_2$ may be different, and some column address subsignals may not have corresponding third exchangers. Details are not described herein again.

According to the foregoing instances, a person of ordinary skill in the art can follow principles such as setting a foregoing third exchanger for at least one column address subsignal and its inverted signal in a column decoder of at least one bank to properly transform the instances to acquire various implementation structures of a nonvolatile memory that includes any number of banks in this embodiment. Details are not described herein again.

In this embodiment, when a nonvolatile memory is powered on, a random number generator generates a selection signal to control each third exchanger in a bank to keep a corresponding column address subsignal and an inverted signal of the column address subsignal unchanged or exchange the corresponding column address subsignal and the inverted signal of the column address subsignal. Because the random number generator generates selection signals randomly, after the nonvolatile memory is powered off and then powered on, a same column address subsignal corresponds to different column gating signals compared with the nonvolatile memory before the power-off, which disarranges data, stored before the nonvolatile memory is powered off, when the nonvolatile memory is powered off and then powered on, so as to achieve an encrypting effect, As a result, data stored in the nonvolatile memory cannot be sequentially read from original storage addresses, and other persons cannot obtain original data even if they use a software tool to directly read the data stored in the nonvolatile memory and it is difficult for them to recover the original data from the data stored in the nonvolatile memory, which ensures security of the data stored in the nonvolatile memory.

A nonvolatile memory in an embodiment of the present invention may specifically be a phase-change memory, a resistive random-access memory (ReRAM), and the like.

In addition, an embodiment of the present invention also provides an electronic device, which includes the nonvolatile memory according to any one of the foregoing embodiments.

The embodiments in this specification are all described in a progressive manner, mutual reference may be made to the same or similar part of the embodiments, and each embodiment focuses on illustrate difference from other embodiments. In particular, for the system embodiment, since it is basically similar to the method embodiment, the apparatus embodiment is described simply, and the relevant part may be obtained with reference to the part of the description of the method embodiment.

The foregoing embodiments of the present invention are not intended to limit the protection scope of the present invention. Any modification, equivalent replacement, and improvement made without departing from the spirit and principle of the present invention shall fall within the protection scope of the present invention.

What is claimed is:

1. A nonvolatile memory, comprising:
   a bank decoder and at least two banks, and the bank comprises a storage array, a row decoder of the storage array, and a column decoder of the storage array; and
   a random number generator and $n_1$ first exchangers disposed between a first signal generator and a first decoder of the bank decoder, and one of the first exchangers corresponds to one bank address subsignal of the bank decoder, wherein:
   the random number generator is configured to: when the nonvolatile memory is powered on, randomly generate a selection signal for each first exchanger and send the generated selection signal to a first exchanger corresponding to the selection signal; and
   the $i_1{}^{th}$ first exchanger of the bank decoder is configured to: receive the $i_2{}^{th}$ bank address subsignal corresponding to the $i_1{}^{th}$ first exchanger and an inverted signal of the $i_2{}^{th}$ bank address subsignal; when a received selection signal is a first signal, output the $i_2{}^{th}$ bank address subsignal as the $i_2{}^{th}$ bank address subsignal to the first decoder and output the inverted signal of the $i_2{}^{th}$ bank address subsignal as the inverted signal of the $i_2{}^{th}$ bank address subsignal to the first decoder; when the received selection signal is a second signal, output the inverted signal of the $i_2{}^{th}$ bank address subsignal as the $i_2{}^{th}$ bank address subsignal to the first decoder and output the $i_2{}^{th}$ bank address subsignal as the inverted signal of the $i_2{}^{th}$ bank address subsignal to the first decoder; and $1 \leq i_1 \leq n_1$, $1 \leq i_2 \leq m_1 \leq m_1$, and where $m_1$ is a total number of bank address subsignals.

2. The nonvolatile memory according to claim 1, wherein at least one bank further comprises: $n_2$ second exchangers disposed between a second signal generator and a second decoder of a row decoder, and one second exchanger corresponds to one row address subsignal of the row decoder, wherein:
   the random number generator is further configured to: when the nonvolatile memory is powered on, randomly generate a selection signal for each second exchanger and send the generated selection signal to a second exchanger corresponding to the selection signal; and
   the $j_1{}^{th}$ second exchanger of each bank is configured to: receive the $j_2{}^{th}$ row address subsignal corresponding to the $j_1{}^{th}$ second exchanger and an inverted signal of the $j_2{}^{th}$ row address subsignal; when a received selection signal is a third signal, output the $j_2{}^{th}$ row address subsignal as the $j_2{}^{th}$ row address subsignal to the second decoder and output the inverted signal of the $j_2{}^{th}$ row address subsignal as the inverted signal of the $j_2{}^{th}$ row address subsignal to the second decoder; when the received selection signal is a fourth signal, output the inverted signal of the $j_2{}^{th}$ row address subsignal as the $j_2{}^{th}$ row address subsignal to the second decoder and output the $j_2{}^{th}$ row address subsignal as the inverted signal of the $j_2{}^{th}$ row address subsignal to the second decoder; and $1 \leq j_1 n_2$, $1 \leq j_2 \leq m_2$, and $1 \leq n_2 \leq m_2$, where $m_2$ is a total number of row address subsignals of a row decoder to which the $j_1{}^{th}$ second exchanger belongs.

3. The nonvolatile memory according to claim 1, wherein at least one bank further comprises $n_3$ third exchangers disposed between a third signal generator and a third decoder of a column decoder, and one third exchanger corresponds to one column address subsignal of the column decoder, wherein:
   the random number generator is further configured to: when the nonvolatile memory is powered on, randomly generate a selection signal for each third exchanger and send the generated selection signal to a third exchanger corresponding to the selection signal; and
   the $k_1{}^{th}$ third exchanger of each bank is configured to: receive the $k_2{}^{th}$ column address subsignal corresponding to the $k_1{}^{th}$ third exchanger and an inverted signal of the $k_2{}^{th}$ column address subsignal; when a received selection signal is a fifth signal, output the $k_2{}^{th}$ column address subsignal as the $k_2{}^{th}$ column address subsignal to the third decoder and output the inverted signal of the $k_2{}^{th}$ column address subsignal as the inverted signal of the $k_2{}^{th}$ column address subsignal to the third decoder; when the received selection signal is a sixth signal, output the inverted signal of the $k_2{}^{th}$ column address subsignal as the $k_2{}^{th}$ column address subsignal to the third decoder and output the $k_2{}^{th}$ column address subsignal as the inverted signal of the $k_2{}^{th}$ column address subsignal to the third decoder; and $1 k_1 \leq n_3$, $1 \leq k_2 \leq m_3$, and $1 \leq n_3 \leq m_3$, where $m_3$ is a total number of column address subsignals of a column decoder to which the $k_1{}^{th}$ third exchanger belongs.

4. The nonvolatile memory according to claim 2, wherein the at least one bank further comprises $n_3$ third exchangers disposed between a third signal generator and a third decoder of a column decoder, and one third exchanger corresponds to one column address subsignal of the column decoder, wherein:
   the random number generator is further configured to: when the nonvolatile memory is powered on, randomly generate a selection signal for each third exchanger and send the generated selection signal to a third exchanger corresponding to the selection signal; and
   the $k_1{}^{th}$ third exchanger of each bank is configured to: receive the $k_2{}^{th}$ column address subsignal corresponding to the $k_1{}^{th}$ third exchanger and an inverted signal of the $k_2{}^{th}$ column address subsignal; when a received selection signal is a fifth signal, output the $k_2{}^{th}$ column address subsignal as the $k_2{}^{th}$ column address subsignal to the third decoder and output the inverted signal of the $k_2{}^{th}$ column address subsignal as the inverted signal of the $k_2{}^{th}$ column address subsignal to the third decoder; when the received selection signal is a sixth signal, output the inverted signal of the $k_2{}^{th}$ column address subsignal as the $k_2{}^{th}$ column address subsignal to the third decoder and output the $k_2{}^{th}$ column address subsignal as the inverted signal of the $k_2{}^{th}$ column address subsignal to the third decoder; $1 \leq k_1 \leq n_3$, $1 \leq k_2 \leq m_3$, and $1 \leq n_3 \leq m_3$, where $m_3$ is a total number of column address subsignals of a column decoder to which the $k_1{}^{th}$ third exchanger belongs.

5. The nonvolatile memory according to claim 1, wherein the random number generator comprises a linear feedback shift register that has at least $n_1$ bits, and a signal, obtained after exclusive OR processing is performed on any two bits of the linear feedback shift register, is used as a shift input signal of the linear feedback shift register; and
   the $n_1$ first exchangers correspond to one bit of the linear feedback shift register separately and a corresponding bit is used as a selection signal sent by the random number generator.

6. The nonvolatile memory according to claim 2, wherein the random number generator comprises a linear feedback shift register that has at least $N_1$ bits, and a signal, obtained after exclusive OR processing is performed on any two bits of the linear feedback shift register, is used as a shift input signal of the linear feedback shift register; $N_1$ is a total number of first exchangers and second exchangers comprised in the nonvolatile memory; and each of the first exchangers and each of the second exchangers correspond to one bit of the linear feedback shift register separately and a corresponding bit is used as a selection signal sent by the random number generator.

7. The nonvolatile memory according to claim 3, wherein the random number generator comprises a linear feedback shift register that has at least $N_2$ bits, and a signal, obtained after exclusive OR processing is performed on any two bits of the linear feedback shift register, is used as a shift input signal of the linear feedback shift register; $N_2$ is a total number of first exchangers and third exchangers comprised in the nonvolatile memory; and each of the first exchangers and each of the third exchangers correspond to one bit of the linear feedback shift register separately and a corresponding bit is used as a selection signal sent by the random number generator.

8. The nonvolatile memory according to claim 4, wherein the random number generator comprises a linear feedback shift register that has at least $N_3$ bits, and a signal, obtained after exclusive OR processing is performed on any two bits of the linear feedback shift register, is used as a shift input signal of the linear feedback shift register; $N_3$ is a total number of first exchangers, second exchangers, and third exchangers comprised in the nonvolatile memory; and each of the first exchangers, each of the second exchangers, and each of the third exchangers correspond to one bit of the linear feedback shift register separately and a corresponding bit is used as a selection signal sent by the random number generator.

9. A nonvolatile memory, comprising:

at least one bank and each bank comprises a storage array, a row decoder of the storage array, and a column decoder of the storage array; and a random number generator, the at least one bank further comprises $n_2$ second exchangers disposed between a second signal generator and a second decoder of the row decoder, and one second exchanger corresponds to one row address subsignal of the row decoder, wherein:

the random number generator is configured to: when the nonvolatile memory is powered on, randomly generate a selection signal for each second exchanger and send the generated selection signal to a second exchanger corresponding to the selection signal; and the $j_1^{th}$ second exchanger of each bank is configured to: receive the $j_2^{th}$ row address subsignal corresponding to the $j_1^{th}$ second exchanger and an inverted signal of the $j_2^{th}$ row address subsignal; when a received selection signal is a third signal, output the $j_2^{th}$ row address subsignal as the $j_2^{th}$ row address subsignal to the second decoder and output the inverted signal of the $j_2^{th}$ row address subsignal as the inverted signal of the $j_2^{th}$ row address subsignal to the second decoder; when the received selection signal is a fourth signal, output the inverted signal of the $j_2^{th}$ row address subsignal as the $j_2^{th}$ row address subsignal to the second decoder and output the $j_2^{th}$ row address subsignal as the inverted signal of the $j_2^{th}$ row address subsignal to the second decoder; and $1 \leq j_1 \leq n_2$, $1 \leq j_2 \leq m_2$, and $1 \leq n_2$, where $m_2$ is a total number of row address subsignals of a row decoder to which the $j_1^{th}$ second exchanger belongs.

10. The nonvolatile memory according to claim 9, wherein the at least one bank further comprises: $n_3$ third exchangers disposed between a third signal generator and a third decoder of the column decoder, and one third exchanger corresponds to one column address subsignal of the column decoder, wherein:

the random number generator is further configured to: when the nonvolatile memory is powered on, randomly generate a selection signal for each third exchanger randomly and send the generated selection signal to a third exchanger corresponding to the selection signal; and the $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal is a fifth signal, output the $k_2^{th}$ column address subsignal as the $k_2^{th}$ column address subsignal to the third decoder and output the inverted signal of the $k_2^{th}$ column address subsignal as the inverted signal of the $k_2^{th}$ column address subsignal to the third decoder; when the received selection signal is a sixth signal, output the inverted signal of the $k_2^{th}$ column address subsignal as the $k_2^{th}$ column address subsignal to the third decoder and output the $k_2^{th}$ column address subsignal as the inverted signal of the $k_2^{th}$ column address subsignal to the third decoder; and $1 \leq k_1 \leq n_3$, $1 \leq k_2 \leq m_3$, and $1 \leq n_3 \leq m_3$, where $m_3$ is a total number of column address subsignals of a column decoder to which the $k_1^{th}$ third exchanger belongs.

11. The nonvolatile memory according to claim 9, wherein the random number generator comprises a linear feedback shift register that has at least $N_4$ bits, and a signal, obtained after exclusive OR processing is performed on any two bits of the linear feedback shift register, is used as a shift input signal of the linear feedback shift register; $N_4$ is a total number of second exchangers comprised in the nonvolatile memory; and each of the second exchangers corresponds to one bit of the linear feedback shift register separately and a corresponding bit is used as a selection signal sent by the random number generator.

12. The nonvolatile memory according to claim 10, wherein the random number generator comprises a linear feedback shift register that has at least $N_5$ bits, and a signal, obtained after exclusive OR processing is performed on any two bits of the linear feedback shift register, is used as a shift input signal of the linear feedback shift register; $N_5$ is a total number of second exchangers and third exchangers comprised in the nonvolatile memory; and each of the second exchangers and each of the third exchangers correspond to one bit of the linear feedback shift register separately and a corresponding bit is used as a selection signal sent by the random number generator.

13. A nonvolatile memory, comprising:

at least one bank and each bank comprises a storage array, a row decoder of the storage array, and a column decoder of the storage array; and a random number generator, the at least one bank further comprises $n_3$ third exchangers disposed between a third signal generator and a third decoder of the column decoder, and one third exchanger corresponds to one column address subsignal of the column decoder, wherein:

the random number generator is configured to: when the nonvolatile memory is powered on, randomly generate a selection signal for each third exchanger and send the generated selection signal to a third exchanger corresponding to the selection signal; and the $k_1^{th}$ third exchanger of each bank is configured to: receive the $k_2^{th}$ column address subsignal corresponding to the $k_1^{th}$ third exchanger and an inverted signal of the $k_2^{th}$ column address subsignal; when a received selection signal is a fifth signal, output the $k_2^{th}$ column address subsignal as the $k_2^{th}$ column address subsignal to the third decoder and output the inverted signal of the $k_2^{th}$ column address subsignal as the inverted signal of the $k_2^{th}$ column address subsignal to the third decoder; when the received selection signal is a sixth signal, output the inverted signal of the $k_2^{th}$ column address subsignal as the $k_2^{th}$ column address subsignal to the third decoder and output the $k_2^{th}$ column address subsignal as the inverted signal of the $k_2^{th}$ column address subsignal to the third decoder; and $1 \le k_1 \le n_3$, $1 \le k_2 \le_{,3}$, and $1 \le n_3 \le m_3$, where $m_3$ is a total number of column address subsignals of a column decoder to which the $k_1^{th}$ third exchanger belongs.

14. The nonvolatile memory according to claim 13, wherein the random number generator comprises a linear feedback shift register that has at least $N_6$ bits, and a signal, obtained after exclusive OR processing is performed on any two bits of the linear feedback shift register, is used as a shift input signal of the linear feedback shift register; $N_6$ is a total number of third exchangers comprised in the nonvolatile memory; and each of the third exchangers corresponds to one bit of the linear feedback shift register separately and a corresponding bit is used as a selection signal sent by the random number generator.

* * * * *